United States Patent
Ito et al.

(10) Patent No.: US 6,240,723 B1
(45) Date of Patent: Jun. 5, 2001

(54) COMPRESSION IGNITION TYPE ENGINE

(75) Inventors: Takekazu Ito, Susono; Shizuo Sasaki, Numazu; Satoshi Iguchi, Mishima; Tsukasa Abe, Susono, all of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/173,184

(22) Filed: Oct. 15, 1998

(30) Foreign Application Priority Data

Dec. 4, 1997 (JP) .................................................. 9-334275

(51) Int. Cl.[7] ........................................................ F01N 3/20
(52) U.S. Cl. .................................. 60/278; 60/285; 60/286; 123/568.21
(58) Field of Search ........................... 60/274, 276, 284, 60/285, 286, 311, 278; 123/295, 305, 568.11, 568.21, 430; 601/300, 301

(56) References Cited

U.S. PATENT DOCUMENTS

| | | | |
|---|---|---|---|
| 4,142,493 | 3/1979 | Schira et al. | 123/119 |
| 4,440,140 | 4/1984 | Kawagoe et al. | 123/571 |
| 4,454,854 | 6/1984 | Gotoh et al. | 123/571 |
| 4,756,155 | * 7/1988 | Shinzawa | 60/285 |
| 5,172,550 | 12/1992 | Takeshima | 60/278 |
| 5,201,802 | * 4/1993 | Hirota et al. | 60/276 |
| 5,482,020 | 1/1996 | Shimizu et al. | 123/417 |
| 5,632,144 | 5/1997 | Isobe | 60/277 |
| 5,724,808 | * 3/1998 | Ito et al. | 60/276 |
| 5,732,554 | 3/1998 | Sasaki et al. | 60/278 |
| 5,743,243 | * 4/1998 | Yanagihara | 123/569 |
| 5,826,427 | * 10/1998 | Yanagihara et al. | 60/276 |

FOREIGN PATENT DOCUMENTS

| | | |
|---|---|---|
| 0 620 364 A2 | 10/1994 | (EP) . |
| 0 740 056 A2 | 10/1996 | (EP) . |
| 0 764 771 A2 | 3/1997 | (EP) . |
| 0 896 141 A2 | 8/1998 | (EP) . |
| 4-334750 | 11/1992 | (JP) . |
| 6-346763 | 12/1994 | (JP) . |
| 7-4287 | 1/1995 | (JP) . |

* cited by examiner

Primary Examiner—Jeanette Chapman
Assistant Examiner—Sneh Varma
(74) Attorney, Agent, or Firm—Oliff & Berridge, PLC

(57) ABSTRACT

A compression ignition type engine, wherein a first combustion where the amount of the inert gas in the combustion chamber is larger than the amount of inert gas where the amount of production of soot peaks and almost no soot is produced and a second combustion where the amount of inert gas in the combustion chamber is smaller than the amount of inert gas where the amount of production of soot peaks are selectively switched between. The second combustion is performed after the engine operation is started until a catalyst arranged in the engine exhaust passage has become activated and, the first combustion is performed after the catalyst has become activated.

22 Claims, 28 Drawing Sheets

Fig.4
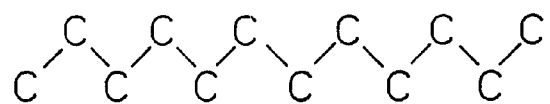
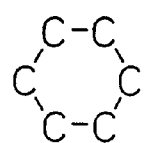 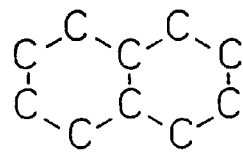
Fig.5
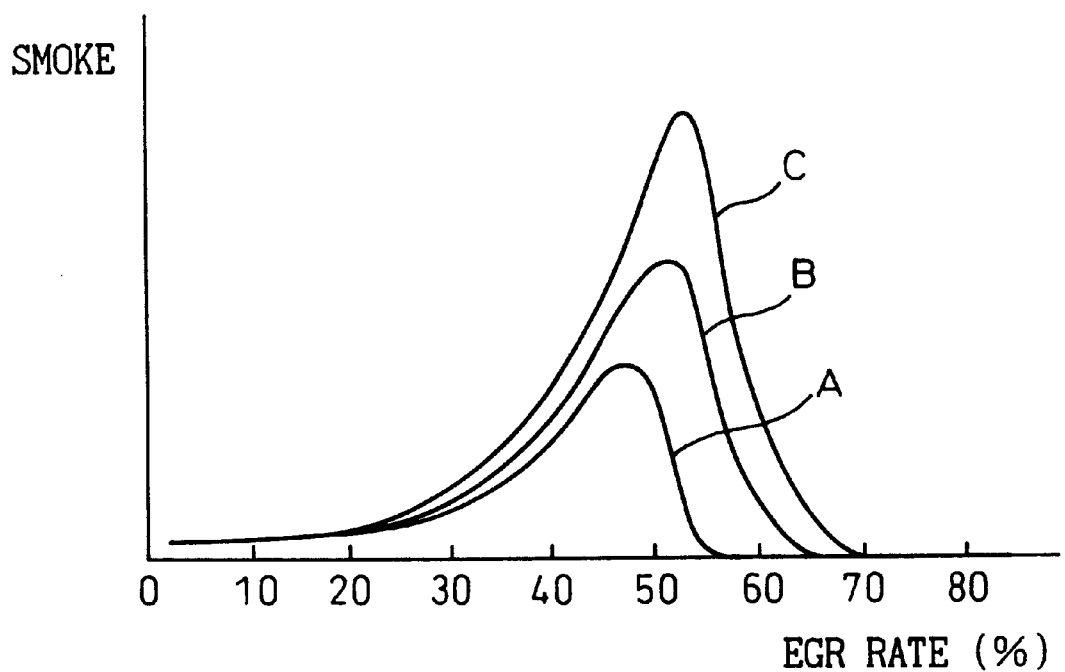

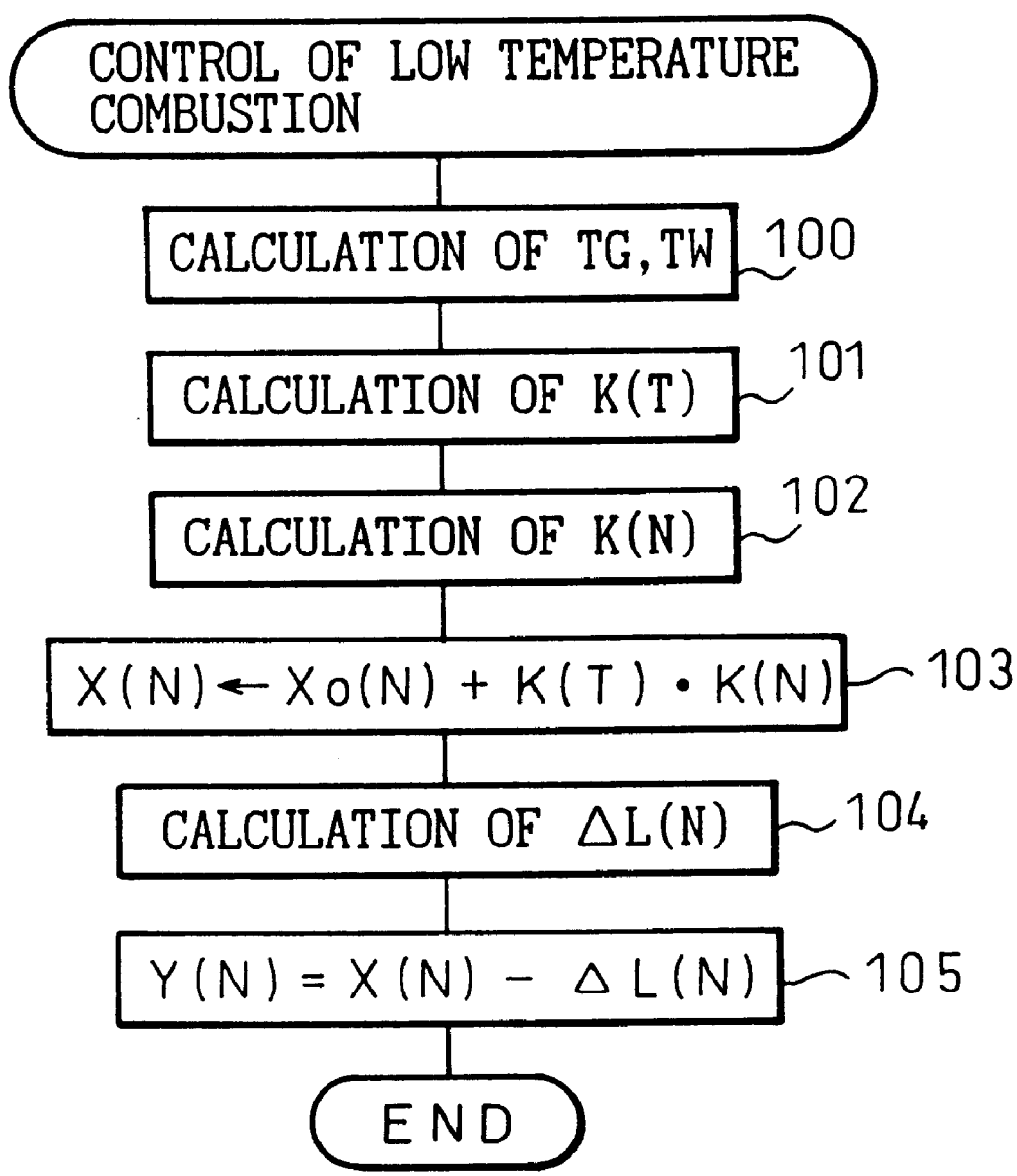

Fig.20
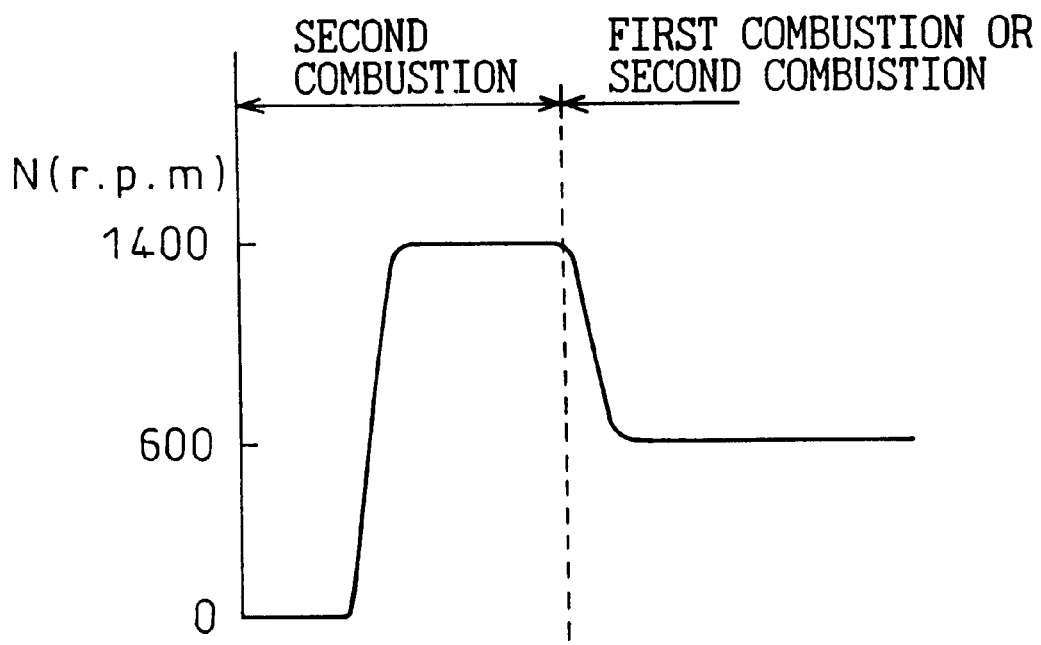
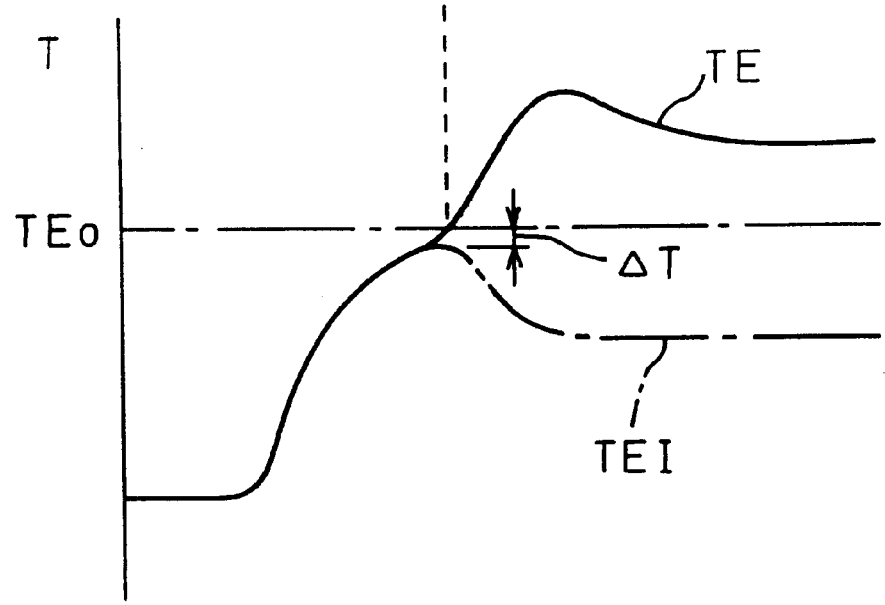

COMPRESSION IGNITION TYPE ENGINE

BACKGROUND OF THE INVENTION

1. Field of the Invention

The present invention relates to a compression ignition type engine.

2. Description of the Related Art

In the past, in an internal combustion engine, for example, a diesel engine, the production of NOx has been suppressed by connecting the engine exhaust passage and the engine intake passage by an exhaust gas recirculation (EGR) passage so as to cause the exhaust gas, that is, the EGR gas, to recirculate in the engine intake passage through the EGR passage. In this case, the EGR gas has a relatively high specific heat and therefore can absorb a large amount of heat, so the larger the amount of EGR gas, that is, the higher the EGR rate (amount of EGR gas/(amount of EGR gas+amount of intake air), the lower the combustion temperature in the engine intake passage. When the combustion temperature falls, the amount of NOx produced falls and therefore the higher the EGR rate, the lower the amount of NOx produced.

In this way, in the past, the higher the EGR rate, the lower the amount of NOx produced can become. If the EGR rate is increased, however, the amount of soot produced, that is, the smoke, starts to sharply rise when the EGR rate passes a certain limit. In this point, in the past, it was believed that if the EGR rate was increased, the smoke would increase without limit. Therefore, it was believed that the EGR rate at which smoke starts to rise sharply was the maximum allowable limit of the EGR rate.

Therefore, in the past, the EGR rate was set within a range not exceeding the maximum allowable limit (for example, see Japanese Unexamined Patent Publication (Kokai) No. 4-334750). The maximum allowable limit of the EGR rate differed considerably according to the type of the engine and the fuel, but was from 30 percent to 50 percent or so. Accordingly, in conventional diesel engines, the EGR rate was suppressed to 30 percent to 50 percent at a maximum.

Since it was believed in the past that there was a maximum allowable limit to the EGR rate, in the past the EGR rate had been set so that the amount of NOx and smoke produced would become as small as possible within a range not exceeding that maximum allowable limit. Even if the EGR rate is set in this way so that the amount of NOx and smoke produced becomes as small as possible, however, there are limits to the reduction of the amount of production of NOx and smoke. In practice, therefore, a considerable amount of NO and smoke continues being produced.

The present inventors, however, discovered in the process of studies on the combustion in diesel engines that if the EGR rate is made larger than the maximum allowable limit, the smoke sharply increases as explained above, but there is a peak to the amount of the smoke produced and once this peak is passed, if the EGR rate is made further larger, the smoke starts to sharply decrease and that if the EGR rate is made at least 70 percent during engine idling or if the EGR gas is force cooled and the EGR rate is made at least 55 percent or so, the smoke will almost completely disappear, that is, almost no soot will be produced. Further, they found that the amount of NOx produced at this time was extremely small. They engaged in further studies later based on this discovery to determine the reasons why soot was not produced and as a result constructed a new system of combustion able to simultaneously reduce the soot and NOx more than ever before. This new system of combustion will be explained in detail later, but briefly it is based on the idea of stopping the growth of hydrocarbons into soot at a stage before the hydrocarbons grow.

That is, what was found from repeated experiments and research was that the growth of hydrocarbons into soot stops at a stage before that happens when the temperatures of the fuel and the gas around the fuel at the time of combustion in the combustion chamber are lower than a certain temperature and the hydrocarbons grow to soot all at once when the temperatures of the fuel and the gas around the fuel become higher than a certain temperature. In this case, the temperatures of the fuel and the gas around the fuel are greatly affected by the heat absorbing action of the gas around the fuel at the time of combustion of the fuel. By adjusting the amount of heat absorbed by the gas around the fuel in accordance with the amount of heat generated at the time of combustion of the fuel, it is possible to control the temperatures of the fuel and the gas around the fuel.

Therefore, if the temperatures of the fuel and the gas around the fuel at the time of combustion in the combustion chamber are suppressed to less than the temperature at which the growth of the hydrocarbons stops midway, soot is no longer produced. The temperatures of the fuel and the gas around the fuel at the time of combustion in the combustion chamber can be suppressed to less than the temperature at which the growth of the hydrocarbons stops midway by adjusting the amount of heat absorbed by the gas around the fuel. On the other hand, the hydrocarbons stopped in growth midway before becoming soot can be easily removed by after-treatment using an oxidation catalyst etc. This is the basic thinking behind this new system of combustion.

In this way, in this new method of combustion, the hydrocarbons stopped in growth midway before becoming soot are basically removed by an oxidation catalyst etc., therefore when the oxidation catalyst etc. is not activated, that is, in the time from when the engine operation is started to when the oxidation catalyst etc. is activated. this new combustion cannot be performed.

SUMMARY OF THE INVENTION

An object of the present invention is to provide a compression ignition type engine capable of suppressing the production of soot from when the engine is started to when the engine is stopped.

According to the present invention, there is provided a compression ignition type engine in which an amount of production of soot gradually increases and then peaks when an amount of inert gas in a combustion chamber increases and in which a further increase of the amount of inert gas in the combustion chamber results in a temperature of fuel and surrounding gas at the time of combustion in the combustion chamber becoming lower than a temperature of production of soot and therefore almost no production of soot any longer, said engine comprising: a catalyst arranged in an engine exhaust passage and having an oxidation function and; switching means for selectively switching between a first combustion where the amount of the inert gas in the combustion chamber is larger than the amount of inert gas where the amount of production of soot peaks and almost no soot is produced and a second combustion where the amount of inert gas in the combustion chamber is smaller than the amount of inert gas where the amount of production of soot peaks, the switching means first performing the second combustion and then switching to the first combustion when the engine operation is started.

BRIEF DESCRIPTION OF THE DRAWINGS

The present invention may be more fully understood from the description of the preferred embodiments of the invention set forth below together with the accompanying drawings, in which:

FIG. 4 is a view of a fuel molecule;

FIG. 5 is a view of the relationship between the amount of smoke produced and the EGR rate;

FIG. 19 is a flow chart of the control of a low temperature combustion region;

FIG. 20 is a time chart of changes in the engine rotational speed etc.;

DESCRIPTION OF THE PREFERRED EMBODIMENTS

Figure 1:
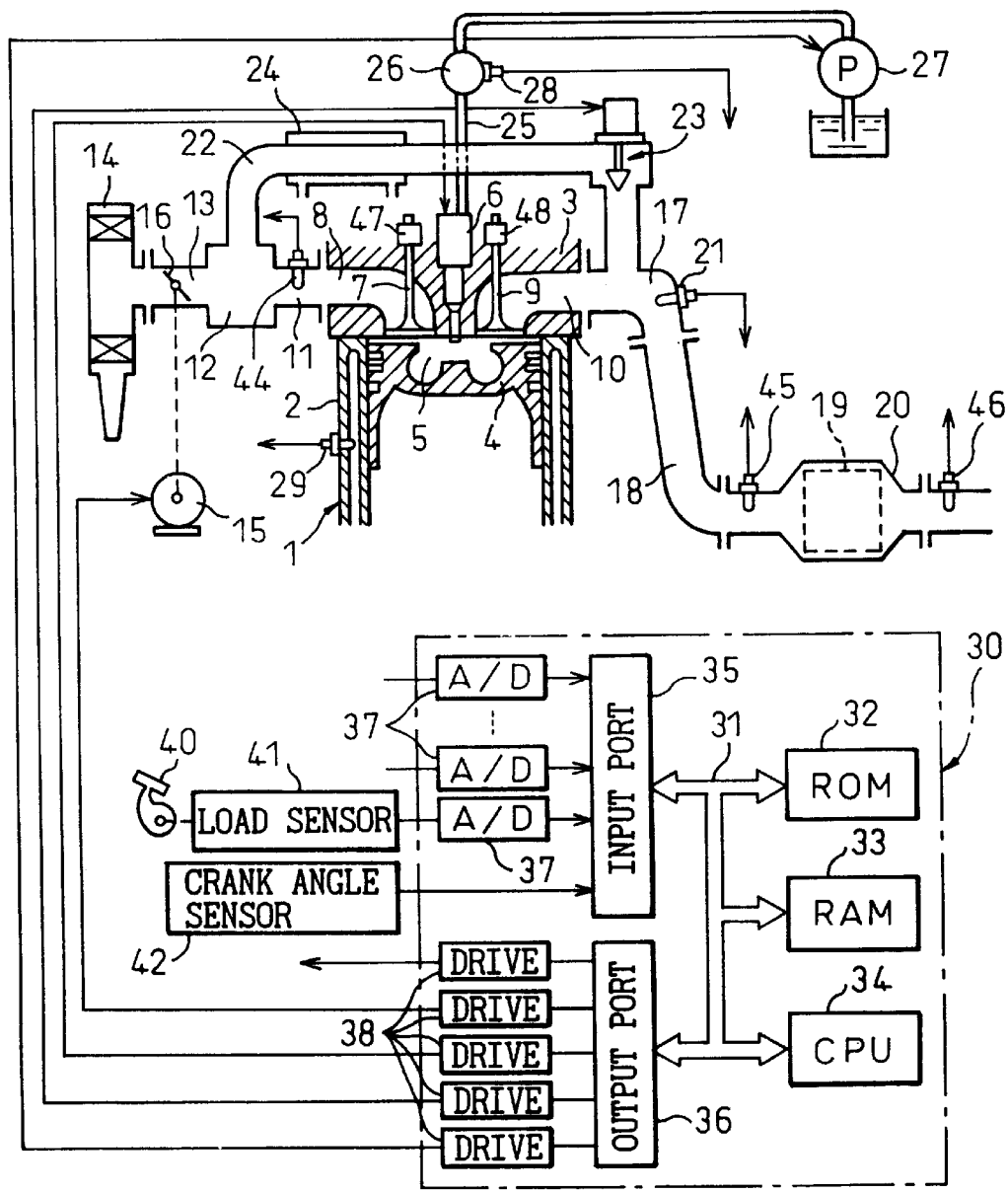
FIG. 1 is an overall view of a compression ignition type engine.

FIG. 1 is a view of the case of application of the present invention to a four-stroke compression ignition type engine.

Referring to FIG. 1, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to a surge tank 12. The surge tank 12 is connected through an intake duct 13 to an air cleaner 14. A throttle valve 16 driven by an electric motor 15 is arranged in the intake duct 13. On the other hand, the exhaust port 10 is connected through an exhaust manifold 17 and exhaust tube 18 to a catalytic converter 20 housing a catalyst 19 having an oxidation function. An air-fuel ratio sensor 21 is arranged in the exhaust manifold 17.

The exhaust manifold 17 and surge tank 12 are connected with each other through an EGR passage 22. An electrically controlled EGR control valve 23 is arranged in an EGR passage 22. Further, a cooling apparatus 24 for cooling the EGR gas flowing through the EGR passage 22 is provided around the EGR passage 22. In the embodiment shown in FIG. 1, the engine cooling water is guided to the cooling apparatus 24 where the engine cooling water is used to cool the EGR gas.

On the other hand, each fuel injector 6 is connected through a fuel supply tube 25 to a fuel reservoir, that is, a common rail 26. Fuel is supplied to the common rail 26 from an electrically controlled variable discharge fuel pump 27. Fuel supplied in the common rail 26 is supplied through each fuel supply tube 25 to the fuel injectors 6. A fuel pressure sensor 28 for detecting the fuel pressure in the common rail 26 is attached to the common rail 26. The amount of discharge of the fuel pump 27 is controlled based on the output signal of the fuel pressure sensor 28 so that the fuel pressure in the common rail 26 becomes the target fuel pressure.

The electronic control unit 30 is comprised of a digital computer and is provided with a ROM (read only memory) 32, a RAM (random access memory) 33, a CPU (microprocessor) 34, an input port 35, and an output port 36 connected with each other by a bidirectional bus 31. The output signal of the air-fuel ratio sensor 21 is input through a corresponding AD converter 37 to the input port 35. Further, the output signal of the fuel pressure sensor 28 is input through a corresponding AD converter 37 to the input port 35. The engine body 1 is provided with a temperature sensor 29 for detecting the engine cooling water temperature. The output signal of this temperature sensor 29 is input through a corresponding AD converter 37 to the input port 35. Further, a temperature sensor 44 for detecting the temperature of the mixed gas of the suction air and the EGR gas is mounted in at least one of the intake tubes 11. The output signal of the temperature sensor 44 is input through a corresponding AD converter 37 to the input port 35.

Further, a temperature sensor 45 for detecting the temperature of the exhaust gas flowing into the catalyst 19 is arranged in the exhaust passage upstream of the catalyst 19, while a temperature sensor 46 for detecting the temperature of the exhaust gas flowing out from the catalyst 19 is arranged in the exhaust passage downstream of the catalyst 19. The output signals of these temperature sensors 45 and 46 are input through the corresponding AD converters 37 to the input port 35.

The accelerator pedal 40 has connected to it a load sensor 41 for generating an output voltage proportional to the amount of depression L of the accelerator pedal 40. The output voltage of the load sensor 41 is input through a corresponding AD converter 37 to the input port 35. Further, the input port 35 has connected to it a crank angle sensor 42 for generating an output pulse each time the crankshaft rotates by for example 30°. On the other hand, the intake valve 7 is provided with an actuator 47 for driving the intake valve 7, while the exhaust valve 9 is provided with an actuator for driving the exhaust valve 9. The output port 36 has connected to it through a corresponding drive circuit 38 the fuel injector 6, electric motor 15, EGR control valve 23, fuel pump 27, and actuators 47 and 48.

Figure 2:
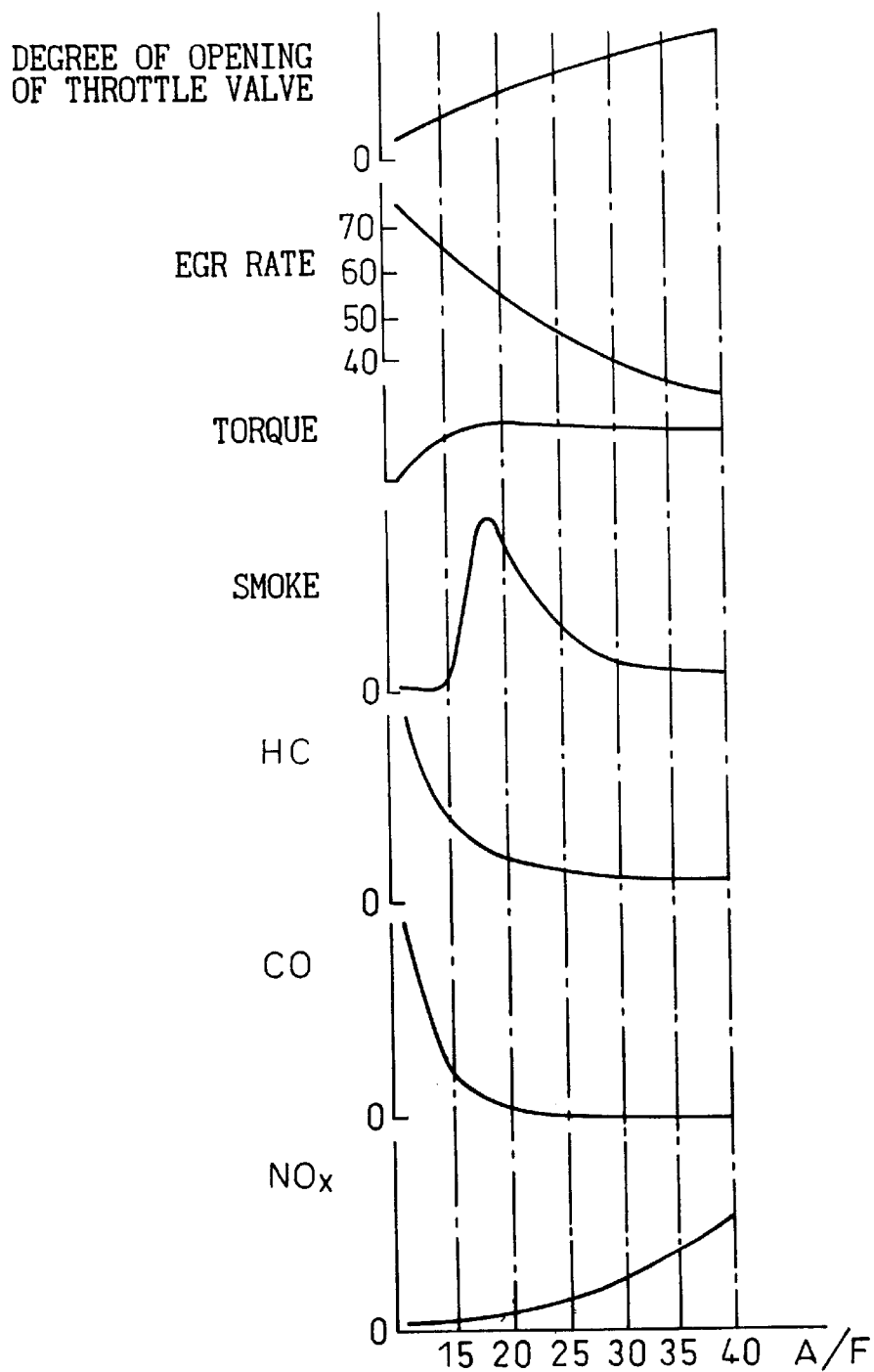
FIG. 2 is a view of the amount of generation of smoke and NOx.

FIG. 2 shows an example of an experiment showing the changes in the output torque and the changes in the amount of smoke, HC, CO, and NOx exhausted when changing the air-fuel ratio A/F (abscissa in FIG. 2) by changing the opening degree of the throttle valve 16 and the EGR rate at the time of engine low load operation. As will be understood from FIG. 2, in this experiment, the EGR rate becomes larger the smaller the air-fuel ratio A/F. When below the stoichiometric air-fuel ratio (≈14.6), the EGR rate becomes over 65 percent.

As shown in FIG. 2, if increasing the EGR rate to reduce the air-fuel ratio A/F, when the EGR rate becomes close to 40 percent and the air-fuel ratio A/F becomes 30 degrees, the amount of smoke produced starts to increase. Next, when the EGR rate is further raised and the air-fuel ratio A/F is made smaller, the amount of smoke produced sharply increases and peaks. Next, when the EGR rate is further raised and the air-fuel ratio A/F is made smaller, the smoke sharply falls. When the EGR rate is made over 65 percent and the air-fuel ratio A/F becomes close to 15.0, the smoke produced becomes substantially zero. That is, almost no soot is produced any longer. At this time, the output torque of the engine falls somewhat and the amount of NOx produced becomes considerably lower. On the other hand, at this time, the amounts of HC and CO produced start to increase.

Figure 3A:
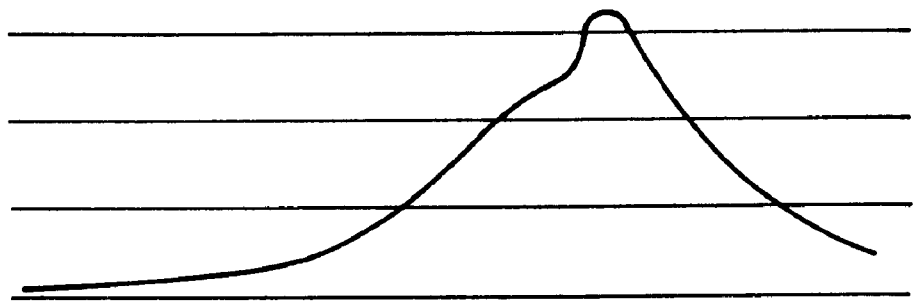
FIGS. 3A and 3B are views of the combustion pressure.
Figure 3B:
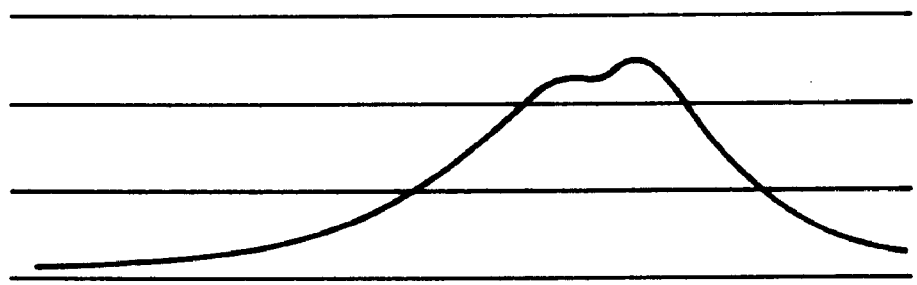

FIG. 3A shows the changes in compression pressure in the combustion chamber 5 when the amount of smoke produced is the greatest near an air-fuel ratio A/F of 21. FIG. 3B shows the changes in compression pressure in the combustion chamber 5 when the amount of smoke produced is substantially zero near an air-fuel ratio A/F of 18. As will be understood from a comparison of FIG. 3A and FIG. 3B, the combustion pressure is lower in the case shown in FIG. 3B where the amount of smoke produced is substantially zero than the case shown in FIG. 3A where the amount of smoke produced is large.

The following may be said from the results of the experiment shown in FIG. 2 and FIGS. 3A and 3B. That is, first, when the air-fuel ratio A/F is less than 15.0 and the amount of smoke produced is substantially zero, the amount of NOx produced falls considerably as shown in FIG. 2. The fact that the amount of NOx produced falls means that the combustion temperature in the combustion chamber 5 falls. Therefore, it can be said that when almost no soot is produced, the combustion temperature in the combustion chamber 5 becomes lower. The same thing may be said from FIG. 3B. That is, in the state shown in FIG. 3B where almost no soot is produced, the combustion pressure becomes lower, therefore the combustion temperature in the combustion chamber 5 becomes lower at this time.

Second, when the amount of smoke produced, that is, the amount of soot produced, becomes substantially zero, as shown in FIG. 2, the amounts of HC and CO exhausted increase. This means that the hydrocarbons are exhausted without growing into soot. That is, the straight chain hydrocarbons and aromatic hydrocarbons contained in the fuel and shown in FIG. 4 decompose when raised in temperature in an oxygen poor state resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons shown in FIG. 4 grow to soot through the soot precursor. Therefore, as explained above, when the amount of production of soot becomes substantially zero, the amount of exhaust of HC and CO increases as shown in FIG. 2, but the HC at this time is a soot precursor or a state of hydrocarbons before that.

Summarizing these considerations based on the results of the experiments shown in FIG. 2 and FIGS. 3A and 3B, when the combustion temperature in the combustion chamber 5 is low, the amount of soot produced becomes substantially zero. At this time, a soot precursor or a state of hydrocarbons before that is exhausted from the combustion chamber 5. More detailed experiments and studies were conducted on this. As a result, it was learned that when the temperatures of the fuel and the gas around the fuel in the combustion chamber 5 are below a certain temperature, the process of growth of soot stops midway, that is, no soot at all is produced and that when the temperature of the fuel and its surroundings in the combustion chamber 5 becomes higher than a certain temperature, soot is produced.

The temperature of the fuel and its surroundings when the process of production of hydrocarbons stops in the state of the soot precursor, that is, the above certain temperature, changes depending on various factors such as the type of the fuel, the air-fuel ratio, and the compression ratio, so it cannot be said what degree it is, but this certain temperature is deeply related with the amount of production of NOx. Therefore, this certain temperature can be defined to a certain degree from the amount of production of NOx. That is, the greater the EGR rate, the lower the temperature of the fuel and the gas surrounding it at the time of combustion and the lower the amount of NOx produced. At this time, when the amount of NOx produced becomes around 10 ppm or less, almost no soot is produced any more. Therefore, the above certain temperature substantially matches the temperature when the amount of NOx produced becomes 10 ppm or less.

Once soot is produced, it is impossible to remove it by after-treatment using an oxidation catalyst etc. As opposed to this, a soot precursor or a state of hydrocarbons before this can be easily removed by after-treatment using an oxidation catalyst etc. Considering after-treatment by an oxidation catalyst etc., there is an extremely great difference between whether the hydrocarbons are exhausted from the combustion chamber 5 in the form of a soot precursor or a state before that or exhausted from the combustion chamber 5 in the form of soot. The new combustion system used in the present invention is based on the idea of exhausting the hydrocarbons from the combustion chamber 5 in the form of a soot precursor or a state before that without allowing the production of soot in the combustion chamber 5 and causing the hydrocarbons to oxidize by an oxidation catalyst etc.

Now, to stop the growth of hydrocarbons in the state before the production of soot, it is necessary to suppress the temperatures of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperatures of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas.

In this case, to suppress the temperatures of the fuel and the gas around it to a temperature lower than the temperature at which soot is produced, an amount of inert gas enough to absorb an amount of heat sufficient for lowering the temperatures is required. Therefore, if the amount of fuel increases, the amount of inert gas required increases along with the same. Note that in this case the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use EGR gas as the inert gas.

FIG. 5 shows the relationship between the EGR rate and smoke when changing the degree of cooling of the EGR gas using the EGR gas as an inert gas. That is, in FIG. 5, the curve A shows the case when force cooling the EGR gas to maintain the temperature of the EGR gas at about 90° C., the curve B shows the case when cooling the EGR gas by a small sized cooling device, and the curve C shows the case when not force cooling the EGR gas.

As shown by the curve A in FIG. 5, when force cooling the EGR gas, the amount of soot produced peaks when the EGR rate becomes slightly lower than 50 percent. In this case, almost no soot is produced any longer when the EGR rate is made at least about 55 percent.

On the other hand, as shown by the curve B in FIG. 5, when slightly cooling the EGR gas, the amount of soot produced peaks when the EGR rate becomes slightly higher than 50 percent. In this case, almost no soot is produced any longer when the EGR rate is made at least about 65 percent.

Further, as shown by the curve C in FIG. 5, when not force cooling the EGR gas, the amount of soot produced peaks when the EGR rate is near 55 percent. In this case, almost no soot is produced any longer when the EGR rate is made at least about 70 percent.

Note that FIG. 5 shows the amount of smoke produced when the engine load is relatively high. When the engine load becomes smaller, the EGR rate where the amount of soot produced peaks falls somewhat and the lower limit of the EGR rate where almost no soot is produced any longer falls somewhat as well. In this way, the lower limit of the EGR rate where almost no soot is produced any longer changes in accordance with the degree of cooling of the EGR gas and the engine load.

Figure 6:
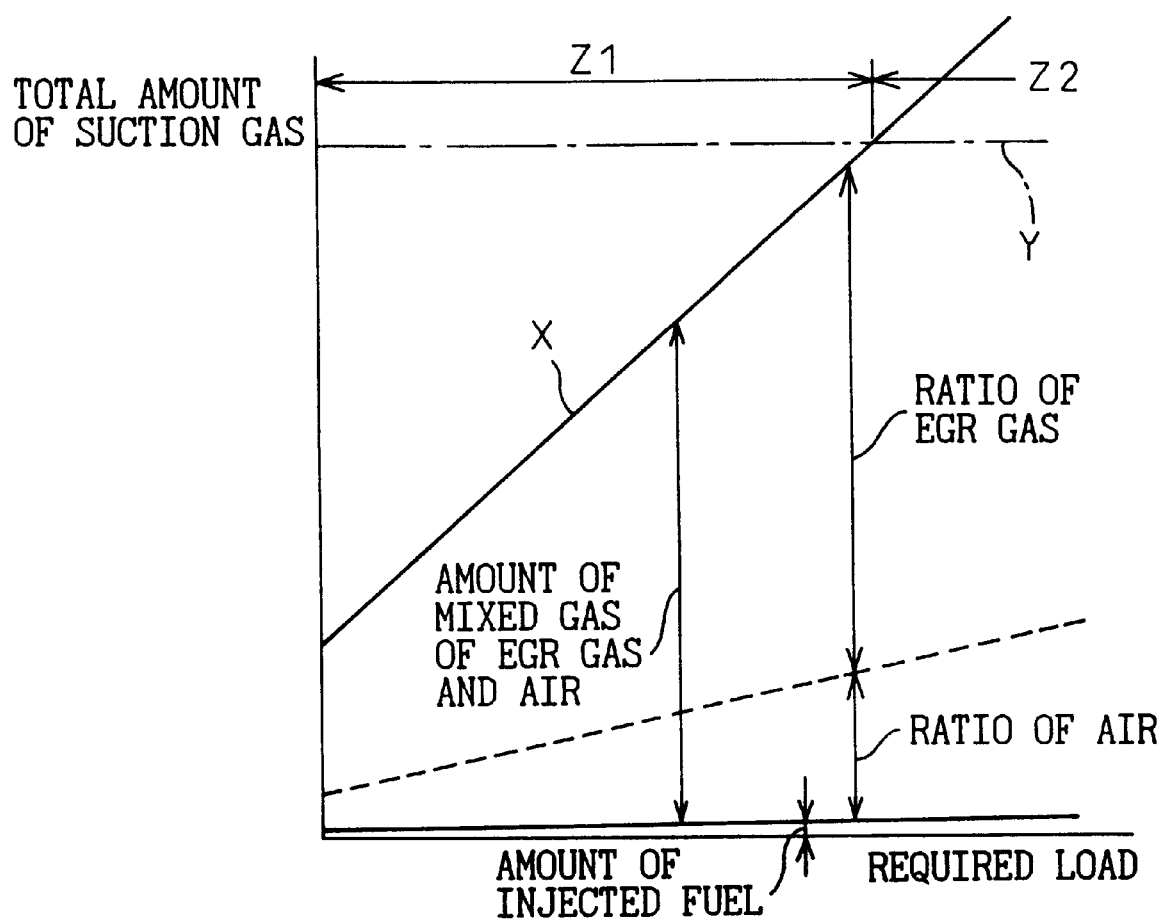
FIG. 6 is a view of the relationship between the amount of injected fuel and the amount of mixed gas.

FIG. 6 shows the amount of mixed gas of EGR gas and air, the ratio of air in the mixed gas, and the ratio of EGR gas in the mixed gas required for making the temperatures of the fuel and the gas around it at the time of combustion a temperature lower than the temperature at which soot is produced in the case of use of EGR gas as an inert gas. Note that in FIG. 6, the ordinate shows the total amount of suction gas taken into the combustion chamber 5. The broken line Y shows the total amount of suction gas able to be taken into the combustion chamber 5 when supercharging is not being performed. Further, the abscissa shows the required load. Z1 shows the low load operating region.

Referring to FIG. 6, the ratio of air, that is, the amount of air in the mixed gas, shows the amount of air necessary for causing the injected fuel to completely burn. That is, in the case shown in FIG. 6, the ratio of the amount of air and the amount of injected fuel becomes the stoichiometric air-fuel ratio. On the other hand, in FIG. 6, the ratio of EGR gas, that is, the amount of EGR gas in the mixed gas, shows the minimum amount of EGR gas required for making the temperatures of the fuel and the gas around it a temperature lower than the temperature at which soot is produced. This amount of EGR gas is, expressed in terms of the EGR rate, about at least 55 percent and, in the embodiment shown in FIG. 6, is at least 70 percent. That is, if the total amount of suction gas taken into the combustion chamber 5 is made the solid line X in FIG. 6 and the ratio between the amount of air and amount of EGR gas in the total amount of suction gas X is made the ratio shown in FIG. 6, the temperatures of the fuel and the gas around it becomes a temperature lower than the temperature at which soot is produced and therefore no soot at all is produced any longer. Further, the amount of NOx produced at this time is around 10 ppm or less and therefore the amount of NOx produced becomes extremely small.

If the amount of fuel injected increases, the amount of heat generated at the time of combustion increases, so to maintain the temperatures of the fuel and the gas around it at a temperature lower than the temperature at which soot is produced, the amount of heat absorbed by the EGR gas must be increased. Therefore, as shown in FIG. 6, the amount of EGR gas has to be increased the greater the amount of injected fuel. That is, the amount of EGR gas has to be increased as the required load becomes higher.

On the other hand, in the load region Z2 of FIG. 6, the total amount of suction gas X required for inhibiting the production of soot exceeds the total amount of suction gas Y which can be taken in. Therefore, in this case, to supply the total amount of suction gas X required for inhibiting the production of soot into the combustion chamber 5, it is necessary to supercharge or pressurize both of the EGR gas and the suction gas or the EGR gas. When not supercharging or pressurizing the EGR gas etc., in the load region Z2, the total amount of suction gas X matches with the total amount of suction gas Y which can be taken in. Therefore, in the case, to inhibit the production of soot, the amount of air is reduced somewhat to increase the amount of EGR gas and the fuel is made to burn in a state where the air-fuel ratio is rich.

As explained above, FIG. 6 shows the case of combustion of fuel at the stoichiometric air-fuel ratio. In the low load operating region Z1 shown in FIG. 6, even if the amount of air is made smaller than the amount of air shown in FIG. 6, that is, even if the air-fuel ratio is made rich, it is possible to obstruct the production of soot and make the amount of NOx produced around 10 ppm or less. Further, in the low load region Z1 shown in FIG. 6, even if the amount of air is made greater than the amount of air shown in FIG. 6, that is, the average value of the air-fuel ratio is made a lean 17 to 18, it is possible to obstruct the production of soot and make the amount of NOx produced around 10 ppm or less.

That is, when the air-fuel ratio is made rich, the fuel becomes in excess, but since the fuel temperature is suppressed to a low temperature, the excess fuel does not grow into soot and therefore soot is not produced. Further, at this time, only an extremely small amount of NOx is produced. On the other hand, when the average air-fuel ratio is lean or when the air-fuel ratio is the stoichiometric air-fuel ratio, a small amount of soot is produced if the combustion temperature becomes higher, but in the present invention, the combustion temperature is suppressed to a low temperature, so no soot at all is produced. Further, only an extremely small amount of NOx is produced.

In this way, in the engine low load operating region Z1, regardless of the air-fuel ratio, that is, whether the air-fuel ratio is rich or the stoichiometric air-fuel ratio or the average air-fuel ratio is lean, no soot is produced and the amount of NOx produced becomes extremely small. Therefore, considering the improvement of the fuel efficiency, it may be said to be preferable to make the average air-fuel ratio lean.

It is however only possible to suppress the temperature of the fuel and the gas surrounding it at the time of combustion in the combustion chamber to less than the temperature where the growth of the hydrocarbons is stopped midway at the time of a relatively low engine load where the amount of heat generated by the combustion is small. Accordingly, in the present invention, when the engine load is relatively low, the temperature of the fuel and the gas surrounding it is suppressed to less than the temperature where the growth of the hydrocarbons stops midway and first combustion, that is, low temperature combustion, is performed. When the engine load is relatively high, second combustion, that is, the conventionally normally performed combustion, is performed. Note that the first combustion, that is, the low temperature combustion, as clear from the explanation up to here, means combustion where the amount of inert gas in the combustion chamber is larger than the amount of inert gas where the amount of production of the soot peaks and where almost no soot is produced, while the second combustion, that is, the conventionally normally performed combustion, means combustion where the amount of inert gas in the combustion chamber is smaller than the amount of inert gas where the amount of production of soot peaks.

Figure 7:
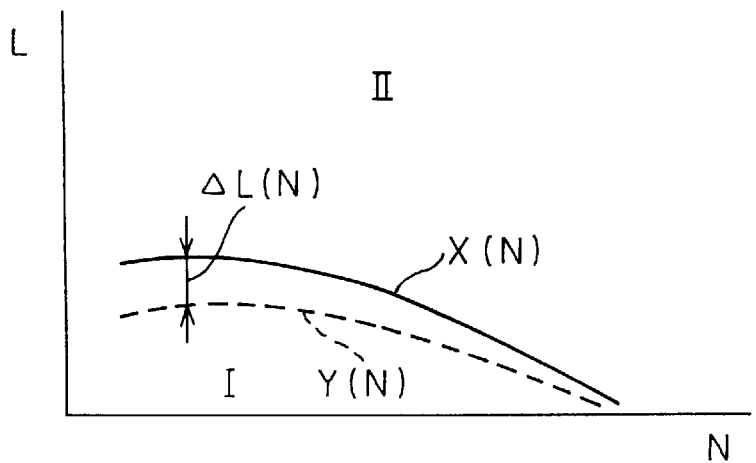
FIG. 7 is a view of a first operating region I and a second operating region II.

FIG. 7 shows a first operating region I where the first combustion, that is, the low temperature combustion, is performed, and a second operating region II where the second combustion, that is, the combustion by the conventional combustion method, is performed. Note that in FIG. 7, the abscissa L shows the amount of depression of the accelerator pedal 40, that is, the required load, and the ordinate N shows the engine rotational speed. Further, in FIG. 7, X(N) shows a first boundary between the first operating region I and the second operating region II, and Y(N) shows a second boundary between the first operating region I and the second operating region II. The change of operating regions from the first operating region I to the second operating region II is judged based on the first boundary X(N), while the change of operating regions from the second operating region II to the first operating region I is judged based on the second boundary Y(N).

That is, when the engine is operating in the first operating region I and the low temperature combustion is being performed, if the required load L exceeds the first boundary X(N), which is a function of the engine rotational speed N, it is judged that the operating region has shifted to the second operating region II and the second combustion, that is, the combustion by the conventional combustion method, is switched to. Next, when the required load L becomes lower than the second boundary Y(N), which is a function of the engine rotational speed N, it is judged that the operating region has shifted to the first operating region I and the first combustion, that is, the low temperature combustion, is again switched to.

Two boundaries were provided, that is, the first boundary X(N) and the second boundary Y(N) at the lower load side of the first boundary X(N), in this way for the following two reasons. The first reason is that at the high load side of the second operating region II, the combustion temperature is relatively high and at this time, even if the required load L becomes lower than the first boundary X(N), low temperature combustion cannot be performed immediately. That is, low temperature combustion cannot be started immediately unless the required load L is considerably low, that is, lower than the second boundary Y(N). The second reason is to provide hysteresis with respect to the change in operating regions between the first operating region I and the second operating region II.

Figure 8:
FIG. 8 is a view of the relationship between $\Delta L(N)$ and the engine rotational speed N.

Note that in this embodiment of the present invention, the second boundary Y(N) is made the low load side from the first boundary X(N) by exactly ΔL(N). As shown in FIG. 7 and FIG. 8, ΔL(N) is a function of the engine rotational speed N. ΔL(N) becomes smaller the higher the engine rotational speed N.

When the engine is operating in the first operating region I and low temperature combustion is being performed, almost no soot is produced, but instead the unburnt hydrocarbons are exhausted from the combustion chamber 5 in the form of a soot precursor or a state before that. At this time, the unburnt hydrocarbons exhausted from the combustion chamber 5 may be oxidized by the catalyst 19 having the oxidation function if the catalyst 19 is activated. When the catalyst 19 is not activated at this time, however, the unburnt hydrocarbons cannot be oxidized by the catalyst 19 and therefore a large amount of unburnt hydrocarbons end up being discharged into the atmosphere. When an engine starts to be operated, however, the catalyst 19 is in many cases not activated. Therefore, in the present invention, first, the second combustion, that is, the combustion by the conventional combustion method, is performed when the engine operation is started, then the first combustion is switched to.

As the catalyst 19, an oxidation catalyst, three-way catalyst, or NOx absorbent may be used. An NOx absorbent has the function of absorbing the NOx when the mean air-fuel ratio in the combustion chamber 5 is lean and releasing the NOx when the mean air-fuel ratio in the combustion chamber 5 becomes rich.

The NOx absorbent is for example comprised of alumina as a carrier and, on the carrier, for example, at least one of potassium K, sodium Na, lithium Li, cesium Cs, and other alkali metals, barium Ba, calcium Ca, and other alkali earths, lanthanum La, yttrium Y, and other rare earths plus platinum Pt or another precious metal.

The oxidation catalyst, of course, and also the three-way catalyst and NOx absorbent have an oxidation function, therefore the three-way catalyst and NOx absorbent can be used as the catalyst 19 as explained above.

The catalyst 19 is activated when the temperature of the catalyst 19 exceeds a certain predetermined temperature.

The temperature at which the catalyst 19 is activated differs depending on the type of the catalyst 19. The activation temperature of a typical oxidation catalyst is about 350° C. The temperature of the exhaust gas passing through the catalyst 19 is lower than the temperature of the catalyst 19 by exactly a slight predetermined temperature, therefore the temperature of the exhaust gas passing through the catalyst 19 represents the temperature of the catalyst 19. Accordingly, in the embodiment of the present invention, it is judged if the catalyst 19 has become activated from the temperature of the exhaust gas passing through the catalyst 19.

Figure 9:
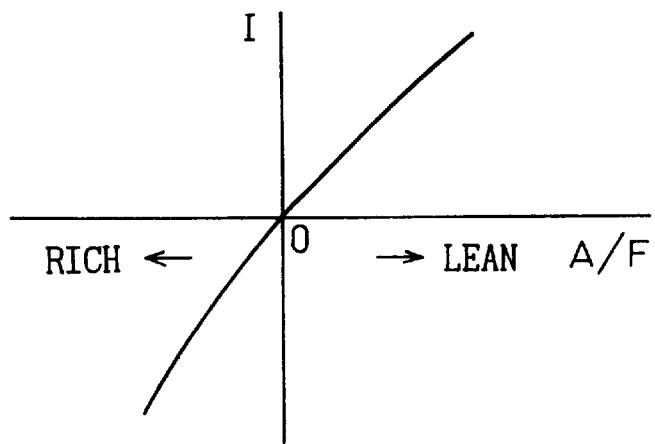
FIG. 9 is a view of the output of the air-fuel ratio sensor.

FIG. 9 shows the output of the air fuel ratio sensor 21. As shown in FIG. 9, the output current I of the air fuel ratio sensor 21 changes in accordance with the air fuel ratio A/F. Therefore, it is possible to determine the air-fuel ratio from the output current I of the air fuel ratio sensor 21.

Next, a general explanation will be given of the control of the operation in the first operating region I and the second operating region II referring to FIG. 10 taking as an example a case where the catalyst 19 is activated.

Figure 10:
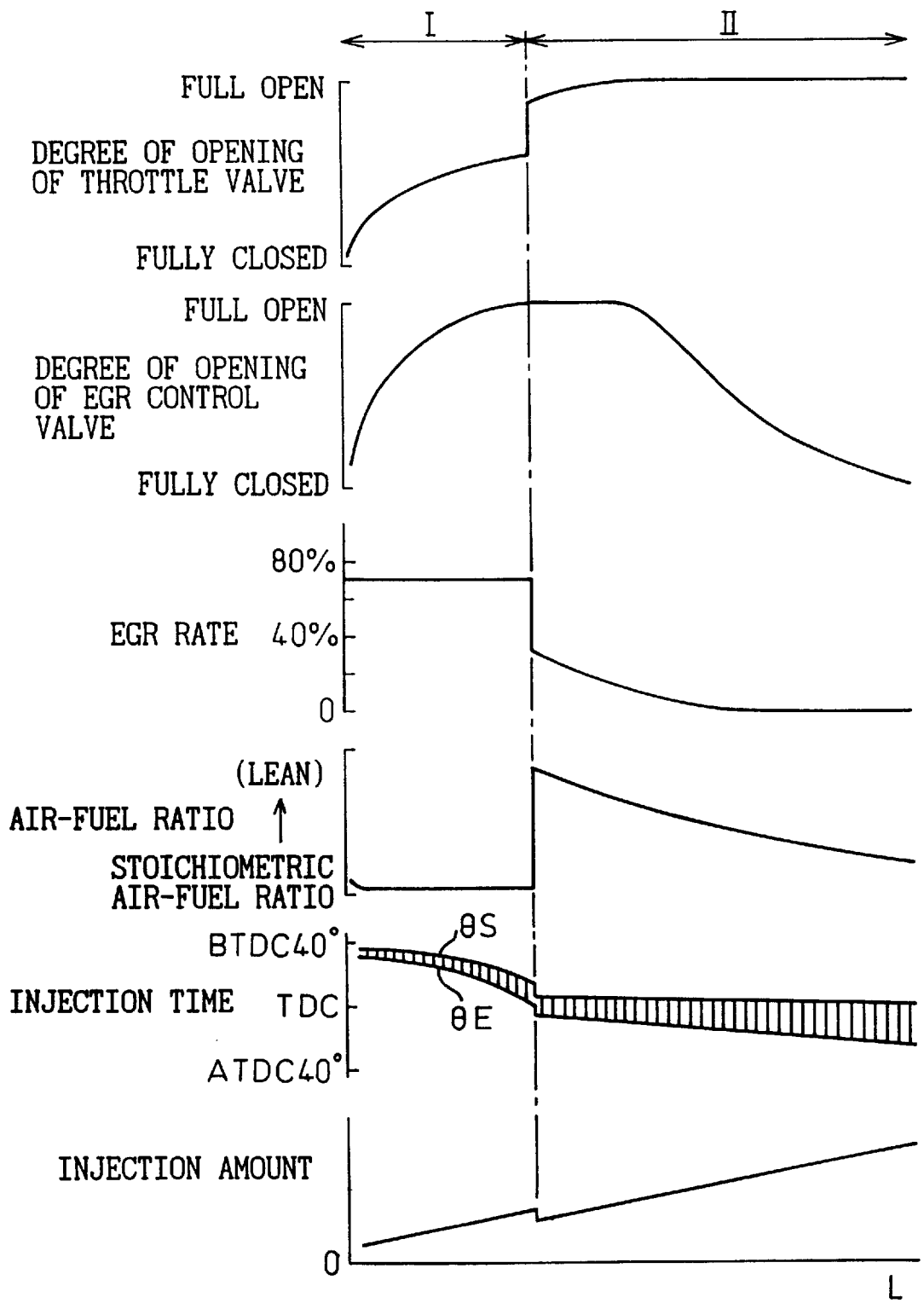
FIG. 10 is a view of the opening degree of a throttle valve etc.

FIG. 10 shows the opening degrees of the throttle valve 16, the opening degree of the EGR control valve 23, the EGR rate, the air-fuel ratio, the injection timing, and the amount of injection with respect to the required load L. As shown in FIG. 10, in the first operating region I with the low required load L, the opening degree of the throttle valve 16 is gradually increased from the fully closed state to the half opened state as the required load L becomes higher, while the opening degree of the EGR control valve 23 is gradually increased from the fully closed state to the fully opened state as the required load L becomes higher. Further, in the example shown in FIG. 10, in the first operating region I, the EGR rate is made about 70 percent and the air-fuel ratio is made a lean air-fuel ratio of 15 to 18.

In other words, in the first operating region, the opening degree of the throttle valve 16 and the opening degree of the EGR control valve 23 are controlled so that the EGR rate becomes about 70 percent and the air-fuel ratio becomes a lean air fuel ratio of 15 to 18. Note that at this time, the air-fuel ratio is controlled to the target air-fuel ratio by correcting the opening degree of the EGR control valve 23 based on the output signal of the air-fuel ratio sensor 21. Further, in the first operating region I, the fuel is injected before top dead center of the compression stroke TDC. In this case, the injection start timing θS becomes later the higher the required load L. The injection end timing θE also becomes later the later the injection start timing θS.

Note that, during idling operation, the throttle valve 16 is made to close to close to the fully closed state. At this time, the EGR control valve 23 is also made to close to close to the fully closed state. If the throttle valve 16 closes to close to the fully closed state, the pressure in the combustion chamber 5 at the start of compression will become low, so the compression pressure will become small. If the compression pressure becomes small, the amount of compression work by the piston 4 becomes small, so the vibration of the engine body 1 becomes smaller. That is, during idling operation, the throttle valve 16 can be closed to close to the fully closed state to suppress vibration in the engine body 1.

When the engine is operating in the first operating region I, almost no soot or NOx is produced and hydrocarbons in the form of a soot precursor or its previous state contained in the exhaust gas can be oxidized by the catalyst 19.

On the other hand, if the engine operating state changes from the first operating region I to the second operating region II, the opening degree of the throttle valve 16 is increased in a step-like manner from the half opened state to the fully opened state. At this time, in the example shown in FIG. 10, the EGR rate is reduced in a step-like manner from about 70 percent to less than 40 percent and the air-fuel ratio is increased in a step-like manner. That is, since the EGR rate jumps over the range of EGR rates (FIG. 5) where a large amount of smoke is produced, there is no longer a large amount of smoke produced when the engine operating state changes from the first operating region I to the second operating region II.

In the second operating region II, the conventionally performed combustion is performed. In this combustion method, some soot and NOx are produced, but the heat efficiency is higher than with the low temperature combustion, so if the engine operating state changes from the first operating region I to the second operating region II, the amount of injection is reduced in a step-like manner as shown in FIG. 10.

In the second operating region II, the throttle valve 16 is held in the fully opened state except in portions and the opening degree of the EGR control valve 23 is gradually made smaller then higher the required load L. Therefore, in the operating region II, the EGR rate becomes lower the higher the required load L and the air-fuel ratio becomes smaller the higher then required load L. Even if the required load L becomes high, however, the air-fuel ratio is made a lean air-fuel ratio. Further, in the second operating region II, the injection start timing θS is made close to top dead center of the compression stroke TDC.

The range of the first operating region I where low temperature combustion is possible changes according to the temperature of the gas in the combustion chamber 5 at the start of compression and the temperature of the surface of the inside wall of the cylinder. That is, if the required load becomes high and the amount of heat generated due to the combustion increases, the temperature of the fuel and its surrounding gas at the time of combustion becomes high and therefore low temperature combustion can no longer be performed. On the other hand, when the temperature of the gas TG in the combustion chamber 5 at the start of compression becomes low, the temperature of the gas in the combustion chamber 5 directly before when the combustion was started becomes lower, so the temperature of the fuel and its surrounding gas at the time of combustion becomes low. Accordingly, if the temperature of the gas TG in the combustion chamber 5 at the start of compression becomes low, even if the amount of heat generated by the combustion increases, that is, even if the required load becomes high, the temperature of the fuel and its surrounding gas at the time of combustion does not become high and therefore low temperature combustion is performed. In other words, the lower the temperature of the gas TG in the combustion chamber 5 at the start of compression, the more the first operating region I where low temperature combustion can be performed expands to the high load side.

Further, the smaller the temperature difference (TW–TG) between the temperature TW of the cylinder inner wall and the temperature of the gas TG in the combustion chamber 5 at the start of compression, the more the amount of heat escaping through the cylinder inner wall during the compression stroke. Therefore, the smaller this temperature difference (TW–TG), the smaller the amount of rise of temperature of the gas in the combustion chamber 5 during the compression stroke and therefore the lower the temperature of the fuel and its surrounding gas at the time of combustion. Accordingly, the smaller the temperature difference (TW−TG), the more the first operating region I where low temperature combustion can be performed expands to the high load side.

Figure 11:
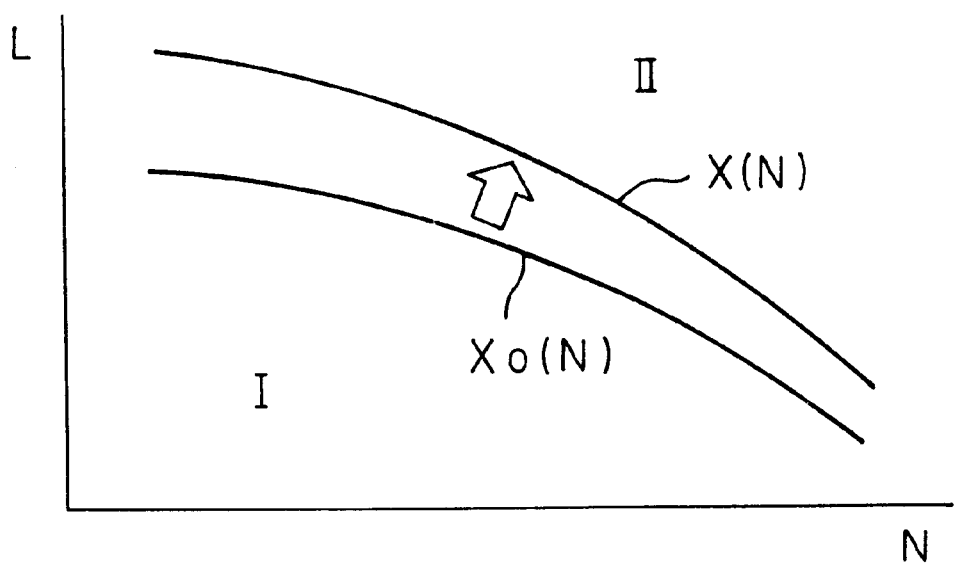
FIG. 11 is a view explaining the method of control of a first boundary X(N)

In this embodiment according to the present invention, when the temperature of the gas TG in the combustion chamber 5 becomes low, as shown in FIG. 11, the first boundary is made to shift from $X_0(N)$ to $X(N)$. When the temperature difference (TW−TG) becomes small, as shown in FIG. 11, the first boundary is made to shift from $X_0(N)$ to $X(N)$. Note that here, $X_0(N)$ shows the reference first boundary. The reference first boundary $X_0(N)$ is a function of the engine rotational speed N. $X(N)$ is calculated using this $X_0(N)$ based on the following equations:

$$X(N) = X_0(N) + K(T) \cdot K(N)$$

$$K(T) = K(T)_1 + K(T)_2$$

Figure 12A:
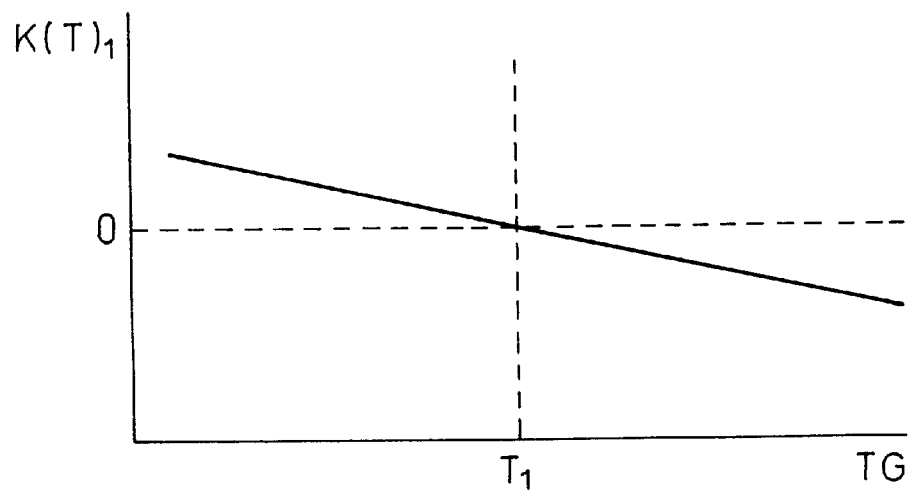
FIGS. 12A to 12C are views of $K(T)_1$, $K(T)_2$, and $K(N)$.
Figure 12B:
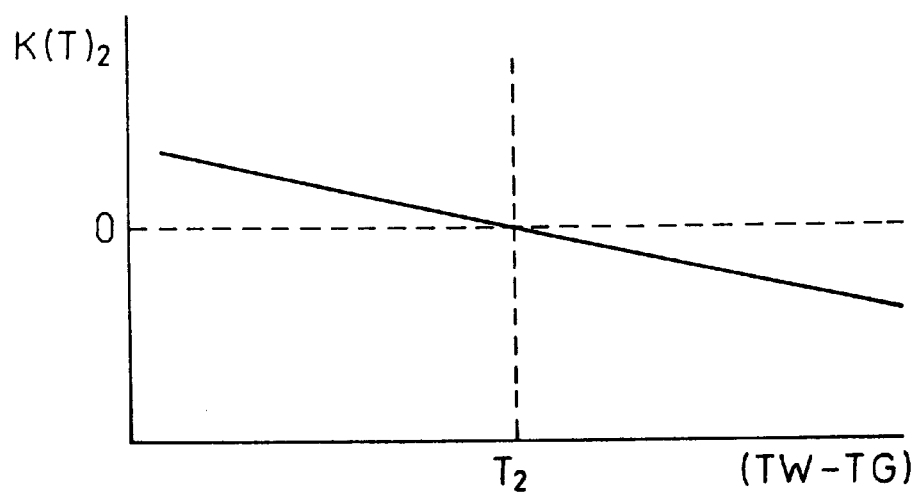

Here, $K(T)_1$, as shown in FIG. 12A, is a function of the temperature of the gas TG in the combustion chamber 5 at the start of compression. The value of $K(T)_1$ becomes larger the lower the temperature of the gas TG in the combustion chamber 5 at the start of compression. Further, $K(T)_2$ is a function of the temperature difference (TW−TG) as shown in FIG. 12B. The value of $K(T)_2$ becomes larger the smaller the temperature difference (TW−TG). Note that in FIG. 12A and FIG. 12B, $T_1$ is the reference temperature and $T_2$ is the reference temperature difference. When $TG=T_1$ and $(TW-TG)=T_2$, the first boundary becomes $X_0(N)$ of FIG. 11.

Figure 12C:
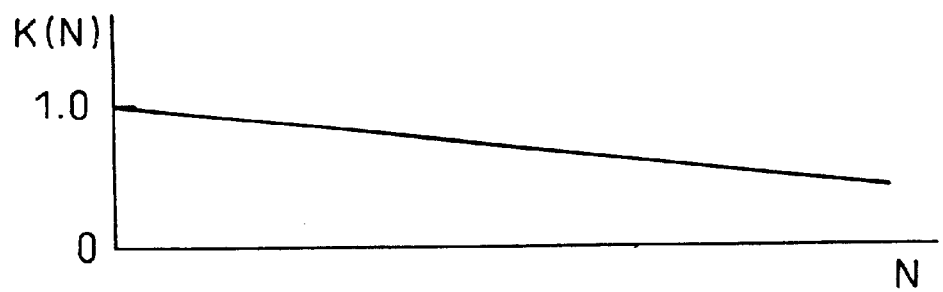

On the other hand, $K(N)$ is a function of the engine rotational speed N as shown in FIG. 12C. The value of $K(N)$ becomes smaller the higher the engine rotational speed N. That is, when the temperature of the gas TG in the combustion chamber 5 at the start of compression becomes lower than the reference temperature $T_1$, the lower the temperature of the gas TG in the combustion chamber 5 at the start of compression, the more the first boundary $X(N)$ shifts to the high load side with respect to $X_0(N)$. When the temperature difference (TW−TG) becomes lower than the reference temperature difference $T_2$, the smaller the temperature difference (TW−TG), the more the first boundary $X(N)$ shifts to the high load side with respect to $X_0(N)$. Further, the amount of shift of $X(N)$ with respect to $X_0(N)$ becomes smaller the higher the engine rotational speed N.

Figure 13A:
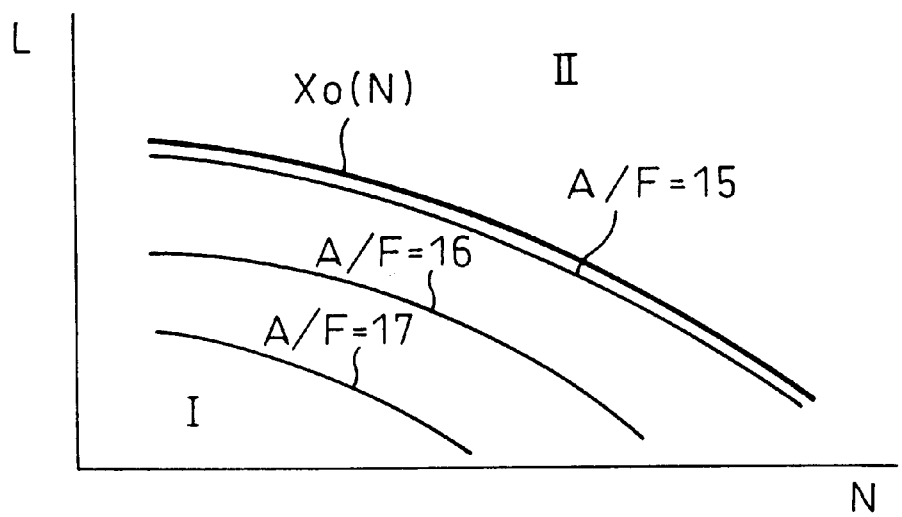
FIGS. 13A and 13B are views of the air-fuel ratio in the first operating region I.

FIG. 13A shows the air-fuel ratio A/F in the first operating region I when the first boundary is the reference first boundary $X_0(N)$. In FIG. 13A, the curves shown by A/F=15, A/F=16, and A/F=17 respectively show the cases where the air-fuel ratio is 15, 16, and 17. The air-fuel ratios between the curves are determined by proportional distribution. As shown in FIG. 13A, in the first operating region, the air-fuel ratio becomes lean. Further, in the first operating region I, the air-fuel ratio A/F is made leaner the lower the required load L.

That is, the lower the required load L, the smaller the amount of heat generated by the combustion. Accordingly, the lower the required load L, the more low temperature combustion can be performed even if the EGR rate is lowered. If the EGR rate is lowered, the air-fuel ratio becomes larger. Therefore, as shown in FIG. 13A, the air-fuel ratio A/F is made larger as the required load L becomes lower. The larger the air-fuel ratio A/F becomes, the more improved the fuel efficiency. Therefore to make the air-fuel ratio as lean as possible, in the embodiment according to the present invention, the air-fuel ratio A/F is made larger the lower the required load L becomes. Note that is the fuel efficiency is not considered, it is also possible to make the air-fuel ratio A/F in the first operating region I a small constant air-fuel ratio, for example, A/F=15.

Figure 13B:
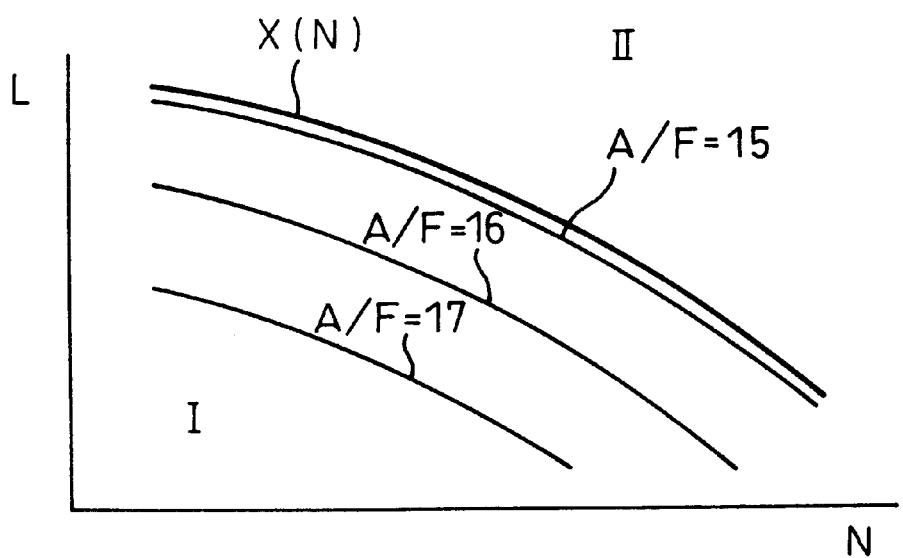

FIG. 13B shows the air-fuel ratio A/F in the first operating region I when the first boundary is $X(N)$ shown in FIG. 11. If comparing FIG. 13A and FIG. 13B, when the first boundary $X(N)$ shifts to the high load side with respect to $X_0(N)$, the curves of A/F=15, A/F=16, and A/F=17 showing the air-fuel ratios also shift to the high load side following the same. Therefore, it is learned that when the first boundary $X(N)$ shifts to the high load side with respect to $X_0(N)$, the air-fuel ratio A/F at the same required load L and the same engine rotational speed N becomes larger. That is, if the first operating region I is made to expand to the high load side, not only is the operating region where almost no soot and NOx are produced expanded, but also the fuel efficiency is improved.

Figure 14A:
FIGS. 14A to 14D are views of a map of a target air-fuel ratio.
Figure 14B:
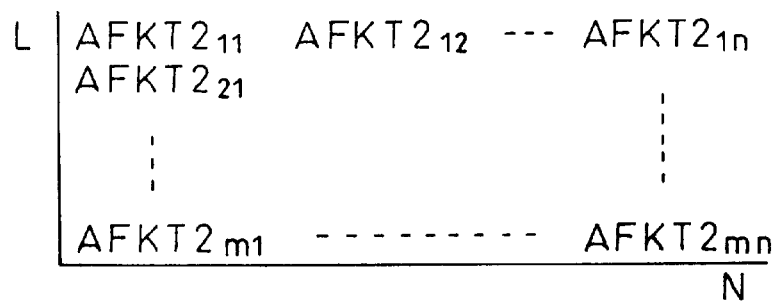
Figure 14C:
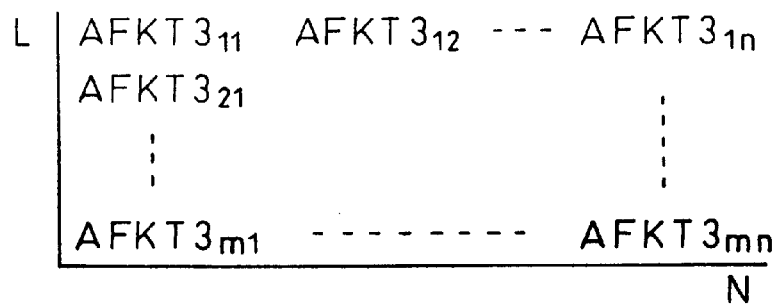
Figure 14D:
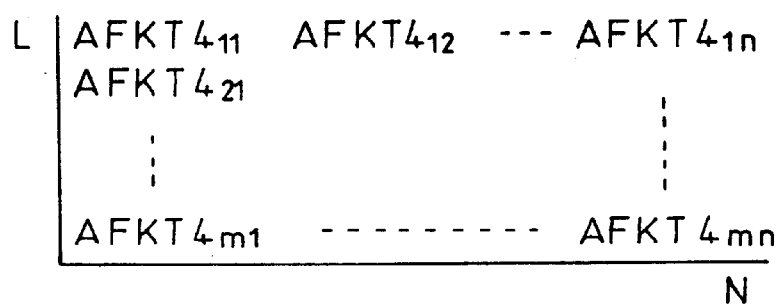

In this embodiment according to the present invention, the target air-fuel ratios in the first operating region I for various different first boundaries $X(N)$, that is, the target air-fuel ratios in the first operating region I for various values of $K(T)$, are stored in advance in the ROM 32 in the form of a map as a function of the required load L and the engine rotational speed N as shown in FIG. 14A to FIG. 14D. That is, FIG. 14A shows the target air-fuel ratio AFKT1 when the value of $K(T)$ is KT1, FIG. 14B shows the target air-fuel ratio AFKT2 when the value of $K(T)$ is KT2, FIG. 14C shows the target air-fuel ratio AFKT3 when the value of $K(T)$ is KT3, and FIG. 14D shows the target air-fuel ratio AFKT4 when the value of $K(T)$ is KT4.

On the other hand, the target opening degrees of the throttle valve 16 required for making the air-fuel ratio the target air-fuel ratios AFKT1, AFKT2, AKFT3, and AFKT4 are stored in advance in the ROM 32 in the form of a map as a function of the required load L and the engine rotational speed N as shown in FIG. 15A to FIG. 15D. Further, the target basic opening degrees of the EGR control valve 23 required for making the air-fuel ratio the target air-fuel ratios AFKT1, AFKT2, AKFT3, and AFKT4 are stored in advance in the ROM 32 in the form of a map as a function of the required load L and the engine rotational speed N as shown in FIG. 16A to FIG. 16D.

Figure 15A:
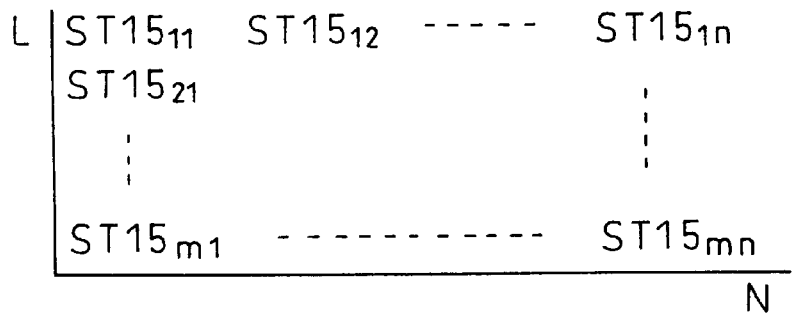
FIGS. 15A to 15D are views of a map of a target opening degree of a throttle valve.
Figure 16A:
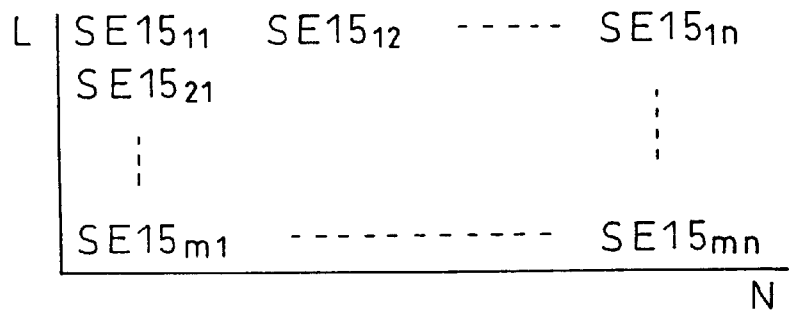
FIGS. 16A to 16D are views of a map of a target basic opening degree of an EGR control valve.

That is, FIG. 15A shows the target opening degree ST15 of the throttle valve 16 when the air-fuel ratio is 15, while FIG. 16A shows the target basic opening degree SE15 of the EGR control valve 23 when the air-fuel ratio is 15.

Figure 15B:
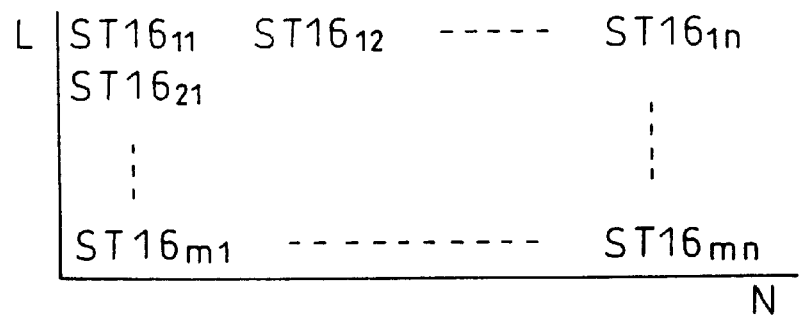
Figure 16B:
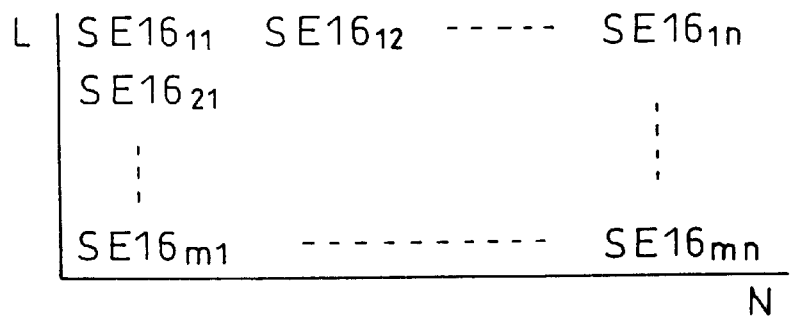

Further, FIG. 15B shows the target opening degree ST16 of the throttle valve 16 when the air-fuel ratio is 16, while FIG. 16B shows the target basic opening degree SE16 of the EGR control valve 23 when the air-fuel ratio is 16.

Figure 15C:
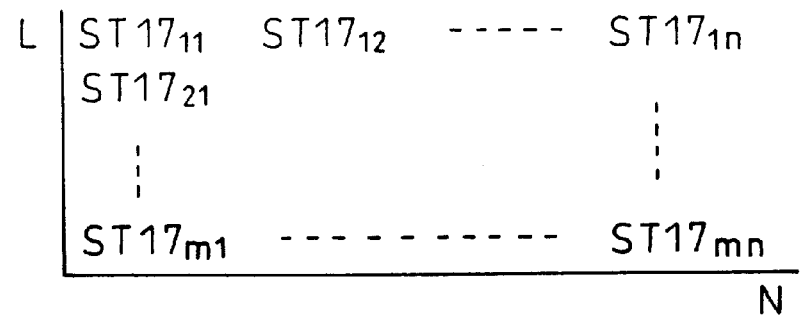
Figure 16C:
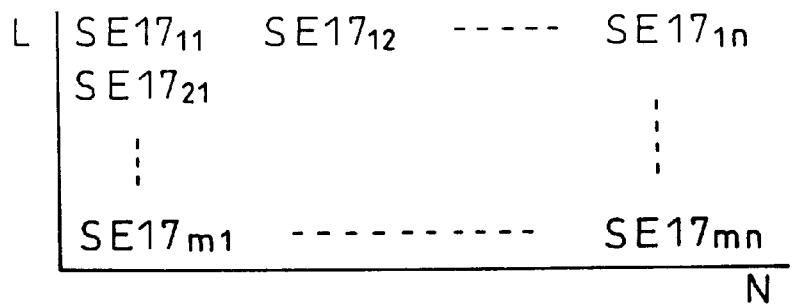

Further, FIG. 15C shows the target opening degree ST17 of the throttle valve 16 when the air-fuel ratio is 17, while FIG. 16C shows the target basic opening degree SE17 of the EGR control valve 23 when the air-fuel ratio is 17.

Figure 15D:
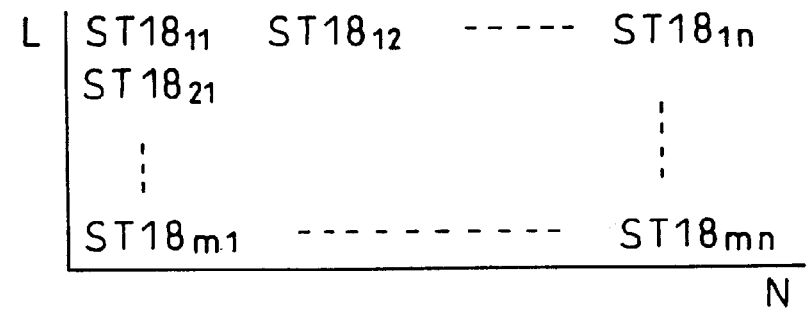
Figure 16D:
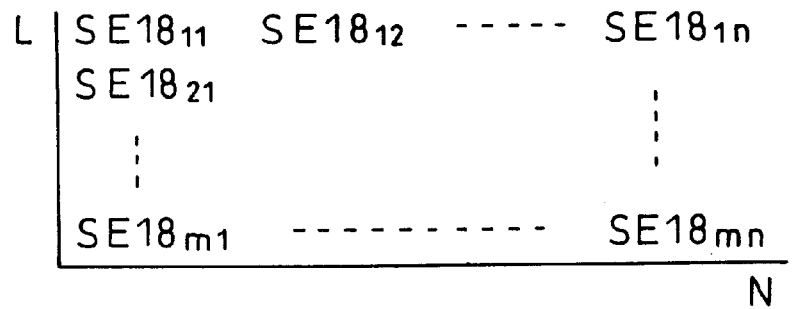

Further, FIG. 15D shows the target opening degree ST18 of the throttle valve 16 when the air-fuel ratio is 18, while FIG. 16D shows the target basic opening degree SE18 of the EGR control valve 23 when the air-fuel ratio is 18.

Figure 17:
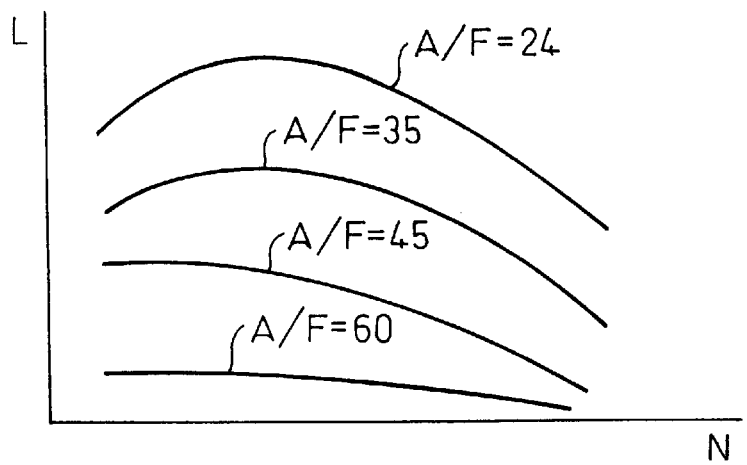
FIG. 17 is a view of an air-fuel ratio in a second combustion etc.
Figure 18A:
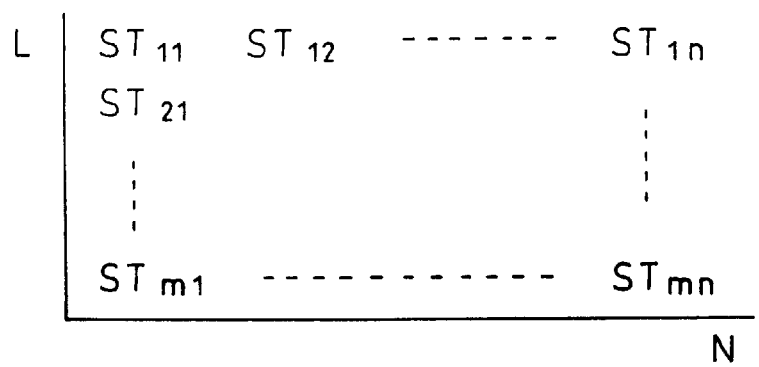
FIGS. 18A and 18B are views of a target opening degree of a throttle valve etc.
Figure 18B:
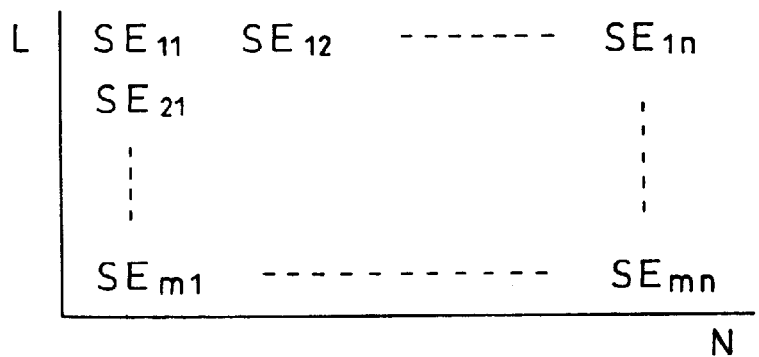

FIG. 17 shows the target air-fuel ratio at the time of second combustion, that is, normal combustion by the conventional combustion method. Note that in FIG. 17, the curves indicated by A/F=24, A/F=35, A/F=45, and A/F=60 respectively show the target air-fuel ratios 24, 35, 45, and 60. The target opening degrees ST of the throttle valve 16 required for making the air-fuel ratio these target air-fuel ratios are stored in advance in the ROM 32 in the form of a map as a function of the required load L and the engine rotational speed N as shown in FIG. 18A. The target opening degrees SE of the EGR control valve 23 required for making the air-fuel ratio these target air-fuel ratios are stored in advance in the ROM 32 in the fore of a map as a function of the required load L and the engine rotational speed N as shown in FIG. 18B.

When the engine is operating in the second operating region II, the air-fuel ratio is made the target air-fuel ratio shown in FIG. 17. Further, even when the engine is operating in the first operating region II, the air-fuel ratio is made the target air-fuel ratio shown in FIG. 17 when the second combustion is to performed.

FIG. 19 shows the routine for control of the low temperature combustion region, that is, the first operating region I.

Referring to FIG. 19, first, at step 100, the temperature of the gas TG inside the combustion chamber 5 at the start of compression and the temperature TW of the cylinder inner wall are calculated. In this embodiment, the temperature of the mixed gas of the suction air and the EGR gas detected by the temperature sensor 44 is made the temperature of the gas TG in the combustion chamber 5 at the start of compression, while the temperature of the engine cooling water detected by the temperature detector 29 is made the temperature TW of the cylinder inner wall. Next, at step 101, $K(T)_1$ is found from the relationship shown in FIG. 12A, $K(T)_2$ is found from the relationship shown in FIG. 12B, and these $K(T)_1$ and $K(T)_2$ are added to calculate $K(T)$ $(=K(T)_1+K(T)_2)$.

Next, at step 102, K(N) is calculated from the relationship shown in FIG. 12C based on the engine rotational speed N. Next, at step 103, the value of the first boundary $X_0(N)$ stored in advance is used to calculate the value of the first boundary X(N) based on the following equation:

$$X(N)=X_0(N)+K(T)\cdot K(N)$$

Next, at step 104, ΔL(N) is calculated from the relationship shown in FIG. 8 based on the engine rotational speed N. Next, at step 105, ΔL(N) is subtracted from X(N) to calculate the value of the second boundary Y(N) (=X(N)−ΔL(N)).

Next, an explanation will be given of changes in the engine rotational speed N and the exhaust gas temperature T until a little time elapses from the start of engine operation referring to FIG. 20.

As shown in FIG. 20, when the engine operation is started, first, the second combustion is performed and the exhaust gas temperature T gradually increases. Next, when the catalyst 19 is activated, the temperature TE of the exhaust gas downstream of the catalyst 19 shown by the solid line starts to become higher than the temperature TEI of the exhaust gas upstream of the catalyst 19 shown by the broken line due to the heat of the oxidation reaction occurring at the catalyst 19. Next, the temperature TE of the exhaust gas downstream of the catalyst 19 reaches $TE_0$. In the first embodiment of the present invention, it is judged that the catalyst 19 has become activated when the temperature difference (=TE−TEI) between the temperature TE of the exhaust gas downstream of the catalyst 19 and the temperature TEI of the exhaust gas upstream of the catalyst 19 becomes greater than a predetermined constant temperature difference ΔT, for example, 10° C. In the second embodiment of the present invention, it is judged that the catalyst 19 has become activated when the temperature TE of the exhaust gas downstream of the catalyst 19 a predetermined temperature $TE_0$, for example, 300° C.

In the first embodiment and the second embodiment, the second combustion is performed after the start of the engine operation until the catalyst 19 becomes activated. When the catalyst 19 becomes activated, the first combustion or the second combustion is performed.

In the embodiments according to the present invention, the engine idling speed is raised, the injection start timing is retarded, and the opening timing of the exhaust valve 9 is advanced so that the catalyst 19 becomes activated as fast as possible when the engine operation is started.

That is, when the engine operation is started, the throttle valve 16 is made to fully open, the opening degree of the EGR control valve 23 is controlled to a predetermined optimum opening degree, and the fuel injection amount Q is increased by exactly the predetermined amount ΔQ compared with the fuel injection amount when the second combustion is being performed after activation of the catalyst 19. Due to this, when the engine operation is started, as shown in FIG. 20, the engine idling speed N is maintained at a speed, for example, 1400 rpm, considerably higher than the engine idling speed after the catalyst 19 becomes activated, for example, 600 rpm. If the engine idling speed N is raised, the temperature of the exhaust gas rises and therefore the activation of the catalyst 19 is speeded up.

Further, the injection start timing θS is retarded by exactly the predetermined constant time ΔθS from the injection start timing when the second combustion is being performed after the activation of the catalyst 19. If the injection start timing θS is retarded, the combustion becomes longer and therefore the temperature of the exhaust gas rises and consequently the catalyst 19 is activated earlier.

Figure 21A:
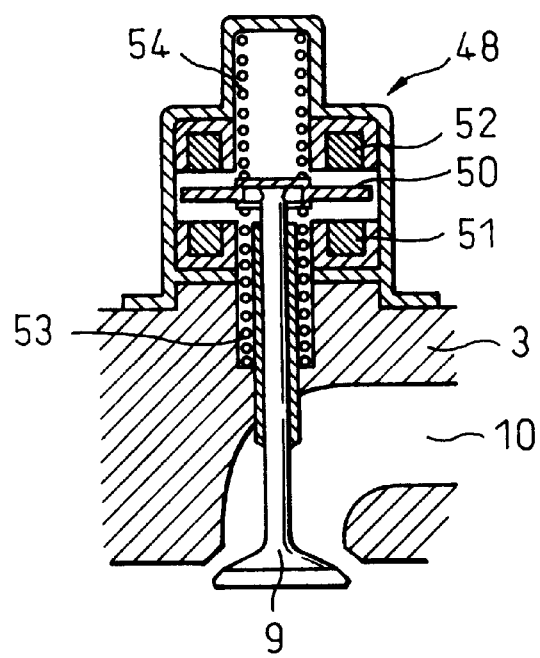
FIGS. 21A and 21B are views for explaining the opening timing of an exhaust valve.

Further, the opening timing of the exhaust valve 9 is made earlier than the opening timing of the exhaust valve 9 after activation of the catalyst 19. The opening timing of the exhaust valve 9 is controlled by the actuator 48. FIG. 21A is an enlarged view of the actuator 48. Referring to FIG. 21A, 50 is a disk shaped piece of iron attached to the top of the exhaust valve 9, 51 and 52 are solenoids arranged at the two sides of the iron disk 50, and 53 and 54 are compression springs arranged at the two sides of the iron disk 50. When the solenoid 52 is energized, the iron disk 50 rises and the exhaust valve 9 closes. As opposed to this, when the solenoid 51 is biased, the iron disk 50 descends and the exhaust valve 9 opens. Accordingly, by controlling the timing of energization of the solenoids 51 and 52, it is possible to open or close the exhaust valve 9 at any timing. Note that the actuator 47 has the same structure as the actuator 48, therefore it is also possible to open or close the intake valve 7 at any timing by the actuator 47.

Figure 21B:
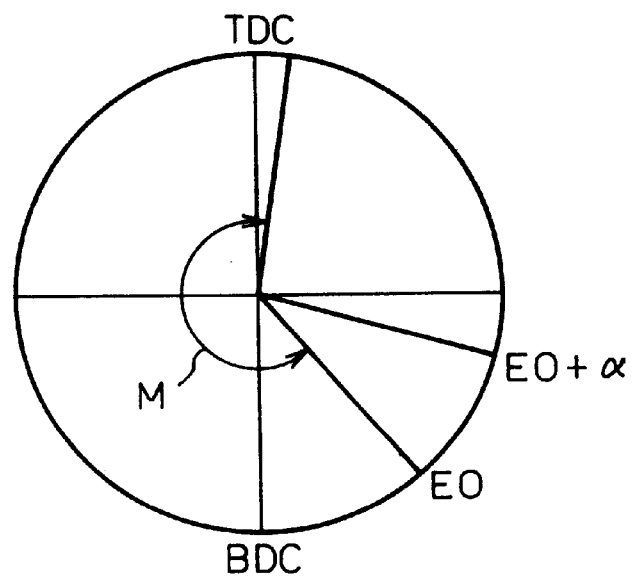

In FIG. 21B, EO and M show the opening timing and the opening time of the exhaust valve 9 after activation of the catalyst 19. EO+α shows the opening timing of the exhaust valve 9 before activation of the catalyst 19. Therefore, it is learned, the opening timing of the exhaust valve 9 when the engine operation has started is made earlier by exactly the time α from the opening timing of the exhaust valve 9 after the activation of the catalyst 19. If the opening timing of the exhaust valve 9 is made earlier, the temperature of the exhaust gas rises and therefore the activation of the catalyst 19 is made earlier. Note that in the first embodiment and the second embodiment, the opening timing of the exhaust valve 9 continues to be made earlier until the elapse of a fixed time after the second combustion is switched to the first combustion so as to sufficiently raise the temperature of the catalyst 19.

Next, an explanation will be made of a first embodiment for control of the operation of the engine referring to FIG. 22 and FIG. 23.

Figure 22:
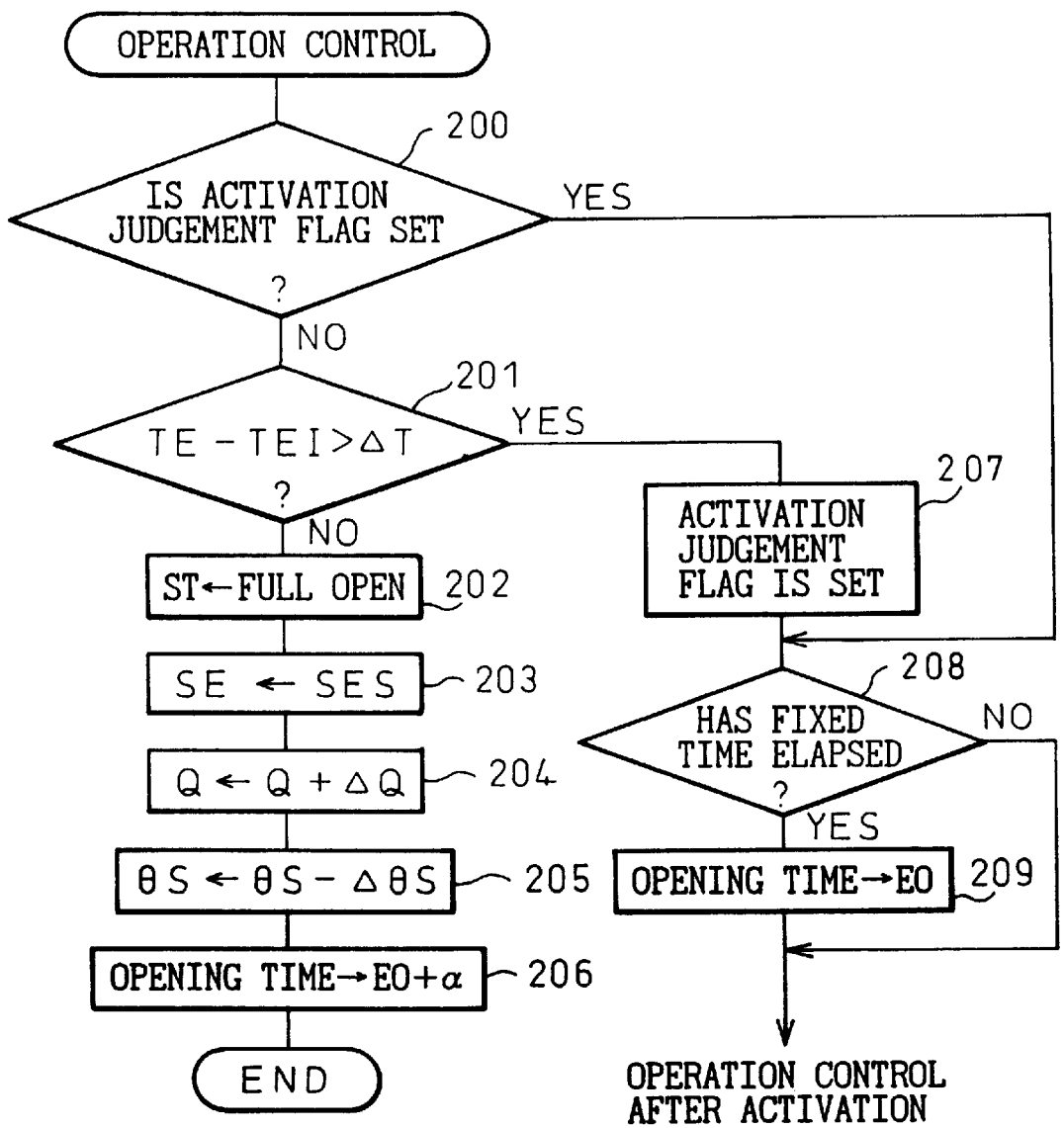
FIG. 22 is a flow chart of a first embodiment of the control of engine operation.
Figure 23:
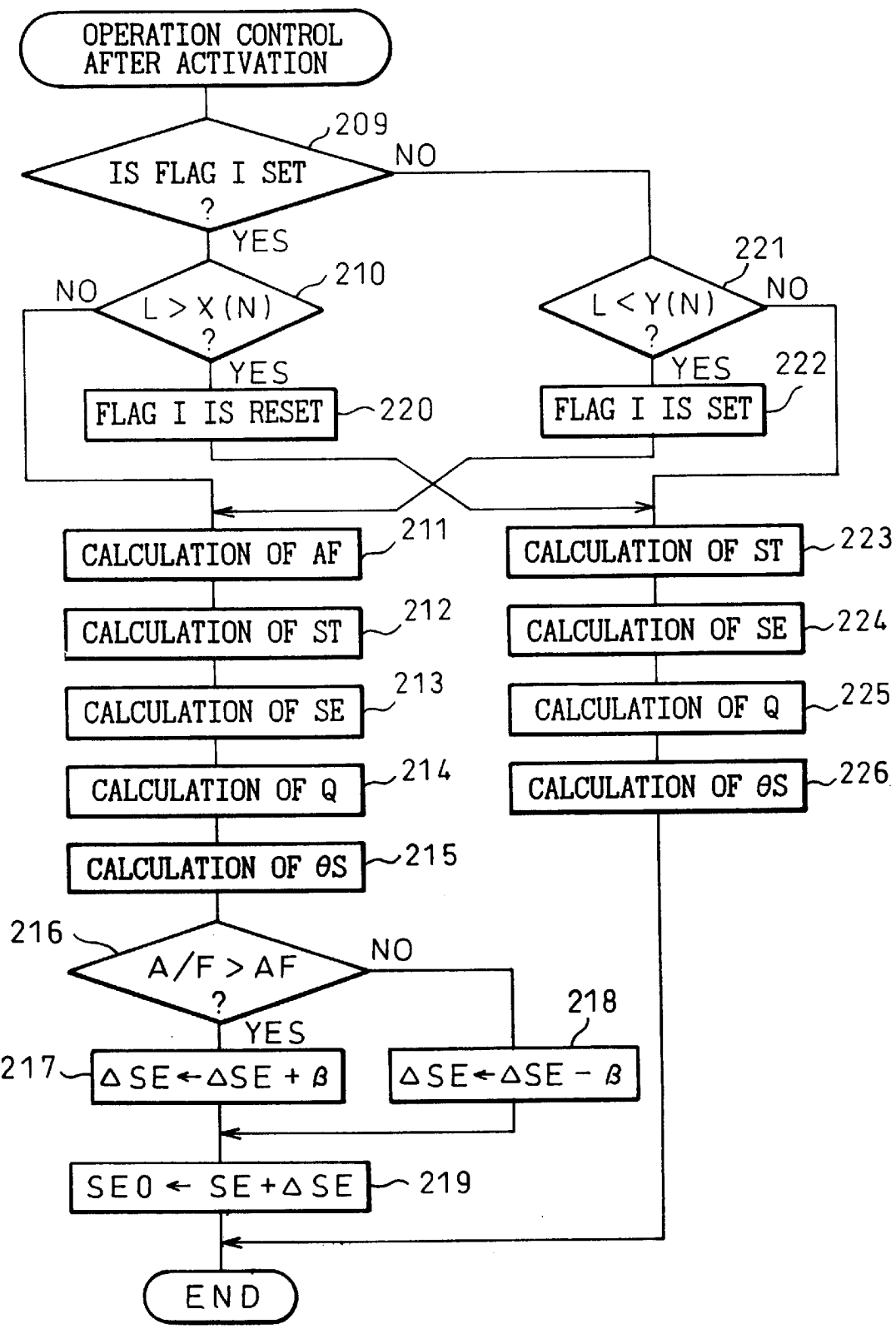
FIG. 23 is a flow chart of control of engine operation after activation.

Referring to FIG. 22 and FIG. 23, first, at step 200, it is judged if an activation judgement flag showing that the catalyst 19 has become activated is set or not. When the activation judgement flag is not set, that is, when the catalyst 19 is still not activated, the routine proceeds to step 201, where it is judged if the temperature difference (=TE−TEI) between the temperature TE of the exhaust gas downstream of the catalyst 19 detected by the temperature sensor 46 and the temperature TEI of the exhaust gas upstream of the catalyst 19 detected by the temperature sensor 45 has become greater than a predetermined temperature difference ΔT, for example, 10° C. When TE−TEI≦ΔT, the routine proceeds to step 202.

At step 202, the target opening degree ST of the throttle valve 16 is made full opening, then at step 203, the target opening degree SE of the EGR control valve 23 is made the predetermined opening degree SES. Next, at step 204, the predetermined amount ΔQ is added to the fuel injection amount Q of when the second combustion is being performed after activation of the catalyst 19 so as to calculate the final fuel injection amount Q (=Q+ΔQ). Next, at step 205, the fixed time ΔθS is subtracted from the injection start timing θS of when the second combustion is being performed after the activation of the catalyst 19 so as to calculate the final injection start timing θS (=θS−ΔθS). Next, at step 206, the opening timing of the exhaust valve 9 is made EO+α. The second combustion is performed at this time.

Next, when it is judged at step 201 that TE−TEI>ΔT, that is, when it is judged that the catalyst 19 has become activated, the routine proceeds to step 207, where the activation judgement flag is set. Next, at step 208, it is judged if a fixed time has elapsed from when TE−TEI>ΔT or not. When the fixed time has not elapsed from when TE−TEI>ΔT, the routine shifts to the operation control routine after activation shown in FIG. 23 and first combustion or second combustion is performed. In the next processing cycle, it is judged at step 200 that the activation judgement flag has been set, so the routine jumps to step 208. Next, when it is judged at step 208 that the fixed time has elapsed from when TE−TEI>ΔT, the routine proceeds to step 209, where the opening time of the exhaust valve 9 is made EO. Therefore, it is learned, the opening timing of the exhaust valve 9 continues to be made earlier until a fixed time has elapsed from when TE−TEI>ΔT.

Referring to the operation control routine after activation shown in FIG. 23, it is judged if the flag I showing that the engine is operating in the first operating region I has been set or not. When the flag I has been set, that is, when the engine is operating in the first operating region I, the routine proceeds to step 210, where it is judged if the requested load L has become larger than the first boundary X(N) or not. When L≦X(N), the routine proceeds to step 211, where the first combustion, that is, low temperature combustion, is performed.

That is, at step 211, the two maps corresponding to K(T) out of the maps shown from FIGS. 14A to 14D are used to calculate the target air-fuel ratio AF by proportional distribution. Next, at step 212, the two maps corresponding to the target air-fuel ratio AF out of the maps shown from FIGS. 15A to 15D are used to calculate the target opening degree ST of the throttle valve 16 by proportional distribution. The opening degree of the throttle valve 16 is controlled to the target opening degree ST. Next, at step 213, the two maps corresponding to the target air-fuel ratio AF out of the maps shown from FIGS. 16A to 16D are used to calculate the target opening degree SE of the EGR control valve 23 by proportional distribution. Next, at step 214, the injection amount Q is calculated, then at step 215, the injection start timing θS is calculated. Next, the routine proceeds to step 216.

At step 216, it is judged if the actual air-fuel ratio A/F detected by the air-fuel ratio sensor 21 is larger than the target air-fuel ratio AF or not. When A/F>AF, the routine proceeds to step 217, where the predetermined value β is added to the correction value ΔSE for the opening degree of the EGR control valve 23, then the routine proceeds to step 219. As opposed to this, when A/f≦AF, the routine proceeds to step 218, where the predetermined value β is subtracted from the correction value ΔSE, then the routine proceeds to step 219. At step 219, the correction value ΔSE is added to the target basic opening degree SE of the EGR control valve 23 to calculate the target opening degree SE0 of the EGR control valve 23. The opening degree of the EGR control valve 23 is controlled to this target opening degree SE0. That is, in this embodiment, by controlling the opening degree of the EGR control valve 23, the actual air-fuel ratio is controlled to the target air-fuel ratio AF. Of course, in this case, it is also possible to control the actual air-fuel ratio to the target air-fuel ratio AF by controlling the opening degree of the throttle valve 16.

On the other hand, when it is judged at step 210 that L>X(N), the routine proceeds to step 220, where the flag I is reset, then the routine proceeds to step 223, where the second combustion, that is, the conventionally performed normal combustion, is performed.

That is, at step 223, the target opening degree ST of the throttle valve 16 is calculated from the map shown in FIG. 18A, then at step 224, the opening degree SE of the EGR control valve 23 is calculated from the map shown in FIG. 18B. Next, at step 225, the fuel injection amount Q is calculated, then at step 226, the injection start timing θS is calculated.

On the other hand, when it is judged at step 209 that the flag I has been reset, that is, when the engine is operating in the second operating region II, the routine proceeds to step 221, where it is judged if the required load L has become smaller than the second boundary Y(N) or not. When L≧Y(N), the routine proceeds to step 223. As opposed to this, when L<Y(N), the routine proceeds to step 222, where the flag I is set. Next, the routine proceeds to step 211, where the first combustion, that is, the low temperature combustion, is performed. Therefore, if the engine is operating in the first operating region I when TE−TEI>ΔT, low temperature combustion is performed, while if operating in the second operating region II, second combustion is performed.

Next, an explanation will be given of a second embodiment for the control of the operation of the engine referring to FIG. 24.

Figure 24:
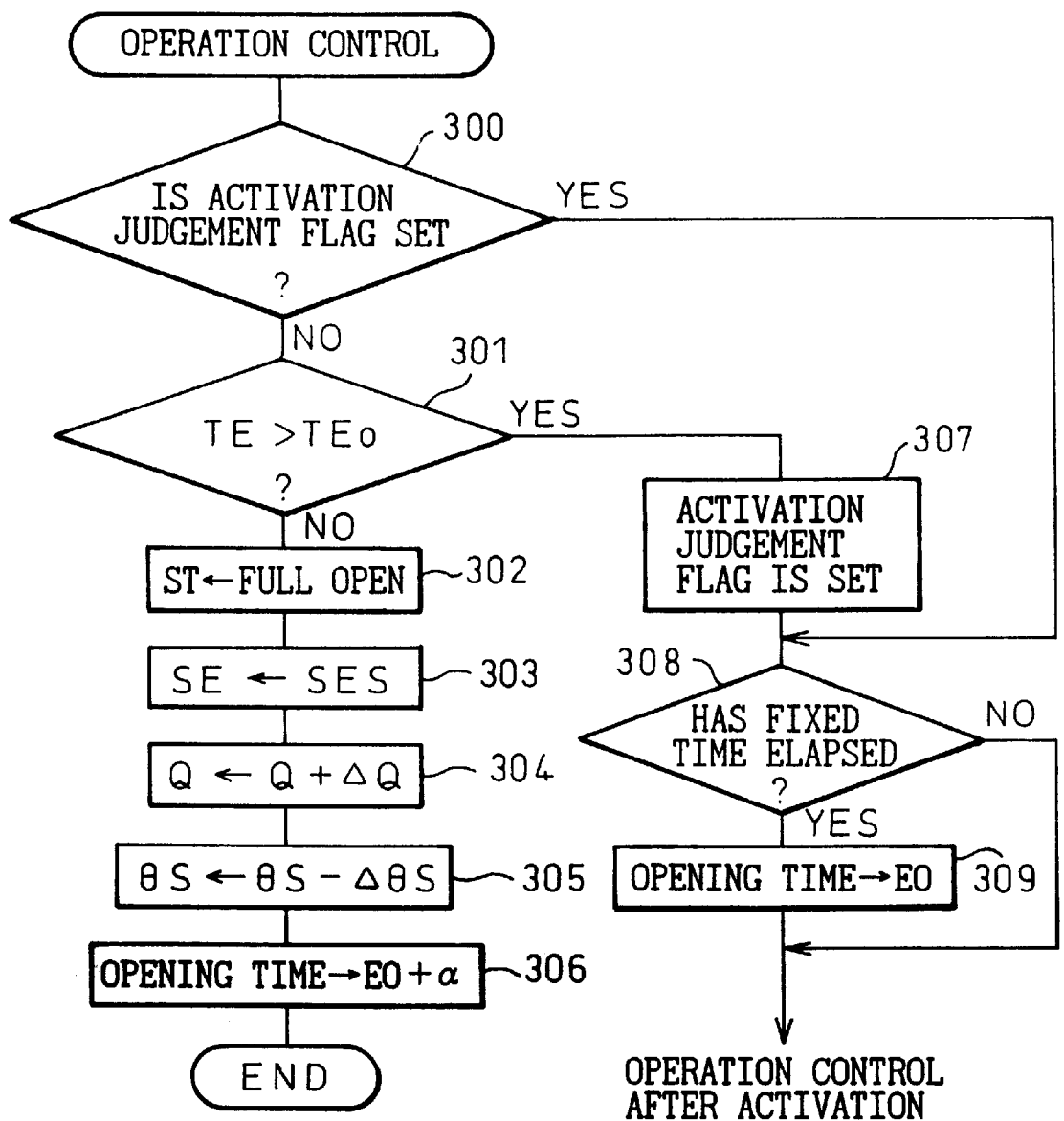
FIG. 24 is a flow chart of a second embodiment of the control of engine operation.

Referring to FIG. 24, first, at step 300, it is judged if an activation judgement flag showing that the catalyst 19 has become activated is set or not. When the activation judgement flag is not set, that is, when the catalyst 19 is still not activated, the routine proceeds to step 301, where it is judged if the temperature TE of the exhaust gas downstream of the catalyst 19 detected by the temperature sensor 46 has become higher than a predetermined temperature $TE_0$, for example, 300° C., or not. When TE≦$TE_0$, the routine proceeds to step 302.

At step 302, the target opening degree ST of the throttle valve 16 is made full opening, then at step 303, the target opening degree SE of the EGR control valve 23 is made the predetermined opening degree SES. Next, at step 304, the predetermined amount ΔQ is added to the fuel injection amount Q of when the second combustion is being performed after activation of the catalyst 19 so as to calculate the final fuel injection amount Q (=Q+ΔQ). Next, at step 305, the fixed time $\Delta\theta S$ is subtracted from the injection start timing $\theta S$ of when the second combustion is being performed after the activation of the catalyst 19 so as to calculate the final injection start timing $\theta S$ (=$\theta S-\Delta\theta S$). Next, at step 306, the opening timing of the exhaust valve 9 is made EO+$\alpha$. The second combustion is performed at this time.

Next, when it is judged at step 301 that TE>$TE_0$, that is, when it is judged that the catalyst 19 has become activated, the routine proceeds to step 307, where the activation judgement flag is set. Next, at step 308, it is judged-if a fixed time has elapsed from when TE>$TE_0$ or not. When the fixed time has not elapsed from when TE>$TE_0$, the routine shifts to the operation control routine after activation shown in FIG. 23 and first combustion or second combustion is performed. In the next processing cycle, it is judged at step 300 that the activation judgement flag has been set, so the routine jumps to step 308. Next, when it is judged at step 308 that the fixed time has elapsed from when TE>$TE_0$, the routine proceeds to step 309, where the opening time of the exhaust valve 9 is made EO. Therefore, it is learned, the opening timing of the exhaust valve 9 continues to be made earlier until a fixed time has elapsed from when TE >$TE_0$.

Figure 25:
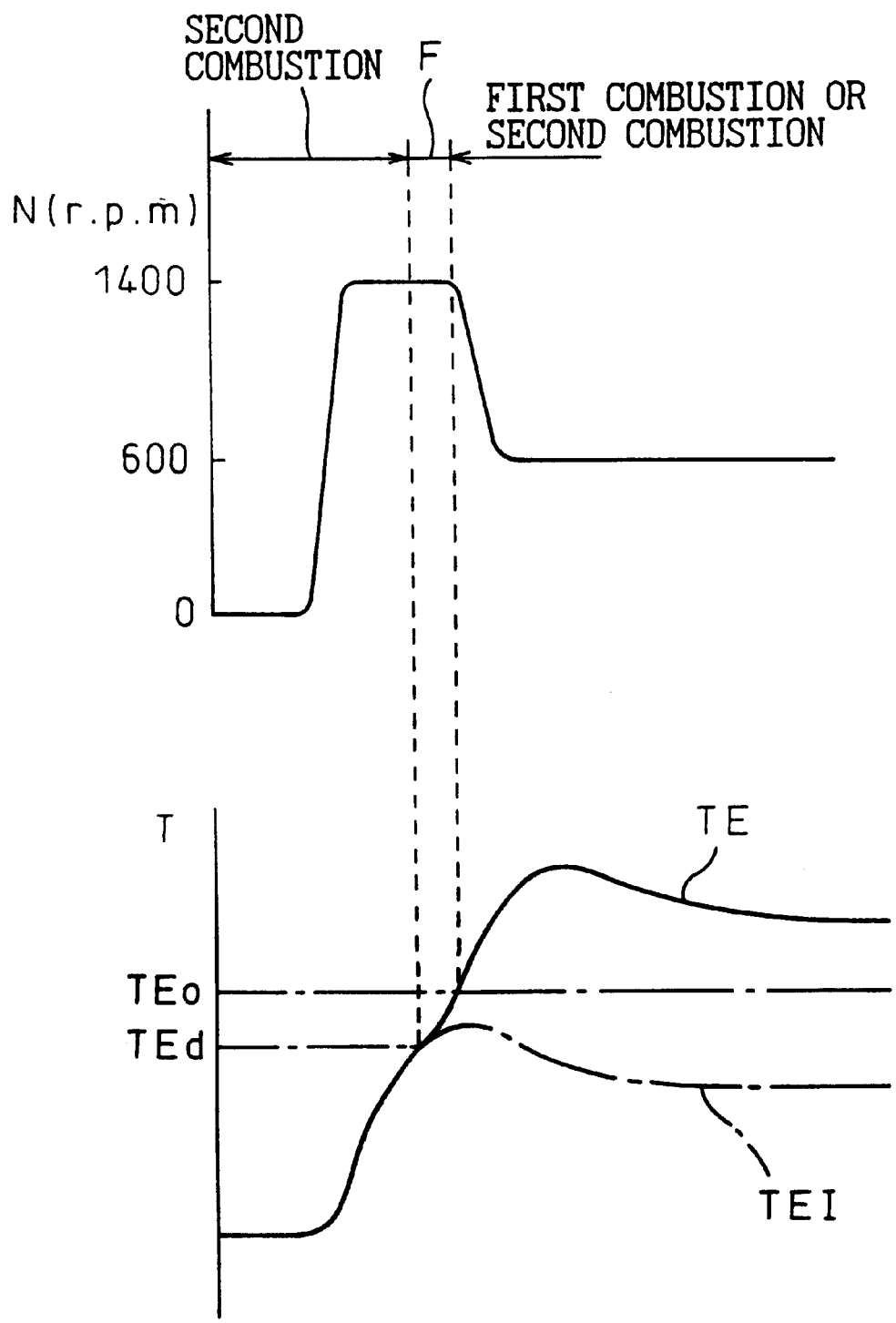
FIG. 25 is a time chart of changes in the engine rotational speed etc.

FIG. 25 shows the case of judging if the catalyst would become activated if the amounts of unburnt HC and CO in the exhaust gas are temporarily increased when the second combustion is being performed and temporarily increasing the amounts of unburnt HC and CO in the exhaust gas in the F region of FIG. 25 when it is judged that the catalyst would become activated if the amounts of unburnt HC and CO in the exhaust gas are temporarily increased. Note that in the third, fourth, fifth, and sixth embodiments explained from here, it is judged that the catalyst would become activated if the amounts of unburnt HC and CO in the exhaust gas are temporarily increased when the temperature TE of the exhaust gas downstream of the catalyst 19 becomes the predetermined temperature $TE_d$ (<$TE_0$) as shown in FIG. 25.

In the third embodiment, when low temperature combustion can be performed in the F region of FIG. 25, low temperature combustion is performed for exactly a fixed time. That is, when the second combustion is being performed, the exhaust gas contains an excess of oxygen, therefore the catalyst 19 adsorbs a large amount of oxygen. If low temperature combustion is performed temporarily in this state, large amounts of unburnt HC and CO will be exhausted from the combustion chamber 5, so the large amounts of unburnt HC and CO will be able to be oxidized all at once by the oxygen adsorbed at the catalyst 19. As a result, the temperature of the catalyst 19 will be able to be raised quickly by the heat of the oxidation reaction at that time and therefore the catalyst 19 will be activated in a short time.

Next, an explanation will be given of a third embodiment for the control of the operation of the engine referring to FIG. 26.

Figure 26:
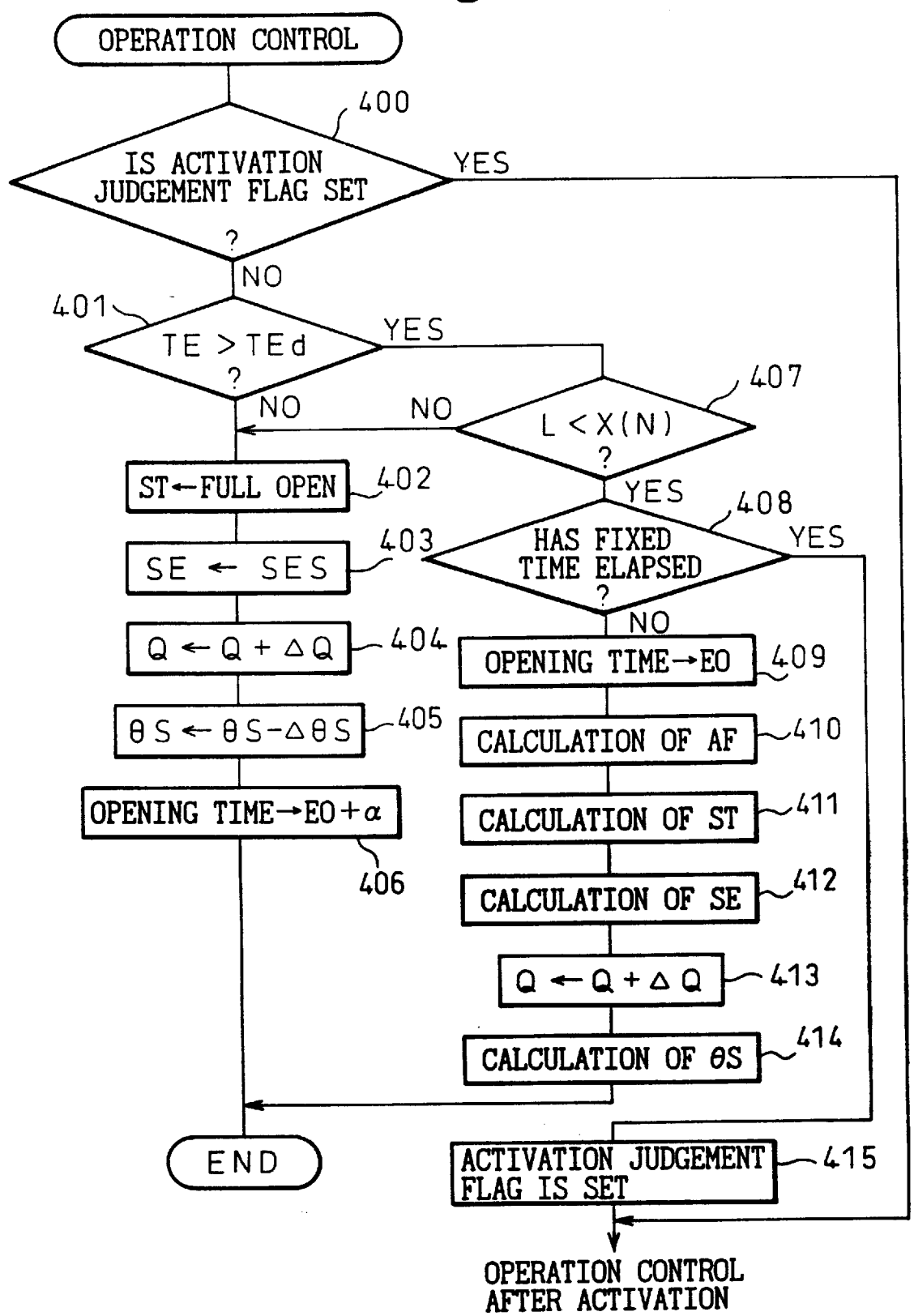
FIG. 26 is a flow chart of a third embodiment of the control of engine operation.

Referring to FIG. 26, first, at step 400, it is judged if an activation judgement flag showing that the catalyst 19 has become activated is set or not. When the activation judgement flag is not set, that is, when the catalyst 19 is still not activated, the routine proceeds to step 401, where it is judged if the temperature TE of the exhaust gas downstream of the catalyst 19 detected by the temperature sensor 46 has become higher than a predetermined temperature $TE_d$, for example, 250° C., or not. When TE$\leq TE_d$, the routine proceeds to step 402.

At step 402, the target opening degree ST of the throttle valve 16 is made full opening, then at step 403, the target opening degree SE of the EGR control valve 23 is made the predetermined opening degree SES. Next, at step 404, the predetermined amount $\Delta Q$ is added to the fuel injection amount Q of when the second combustion is being performed after activation of the catalyst 19 so as to calculate the final fuel injection amount Q (=Q+$\Delta Q$). Next, at step 405, the fixed time $\Delta\theta S$ is subtracted from the injection start timing $\theta S$ of when the second combustion is being performed after the activation of the catalyst 19 so as to calculate the final injection start timing $\theta S$ (=$\theta S-\Delta\theta S$). Next, at step 406, the opening timing of the exhaust valve 9 is made EO+$\alpha$. The second combustion is performed at this time.

Next, when it is judged at step 401 that TE>$TE_d$, the routine proceeds to step 407, where it is judged if the required load L is lower than the first boundary X(N) or not, that is, if low temperature combustion can be performed. When L$\geq$X(N), the routine proceeds to step 402. As opposed to this, when L<X(L), the routine proceeds to step 408, where it is judged if the fixed time has elapsed or not. When the fixed time has not elapsed, the routine proceeds to step 409, where the opening timing of the exhaust valve 9 is made EO. Next, the routine proceeds to step 410, where the low temperature combustion is performed.

That is, at step 410, the two maps corresponding to K(T) out of the maps shown from FIGS. 14A to 14D are used to calculate the target air-fuel ratio AF by proportional distribution. Next, at step 411, the two maps corresponding to the target air-fuel ratio AF out of the maps shown from FIGS. 15A to 15D are used to calculate the target opening degree ST of the throttle valve 16 by proportional distribution. The opening degree of the throttle valve 16 is controlled to the target opening degree ST. Next, at step 412, the two maps corresponding to the target air-fuel ratio AF out of the maps shown from FIGS. 16A to 16D are used to calculate the target opening degree SE of the EGR control valve 23 by proportional distribution. The opening degree of the EGR control valve 23 is controlled to this target opening degree SE. Next, at step 413, the fuel injection amount Q (=Q+$\Delta Q$) is calculated, then at step 414, the injection start timing $\theta S$ is calculated.

On the other hand, when it is judged at step 408 that the fixed time has elapsed, the routine proceeds to step 415, where the activation judgement flag is set. Next, the operation control routine after activation shown in FIG. 23 is executed and first combustion or second combustion is performed. When the activation judgement flag has been set, the routine then proceeds from step 400 to the, operation control routine after activation shown in FIG. 23.

Figure 27:
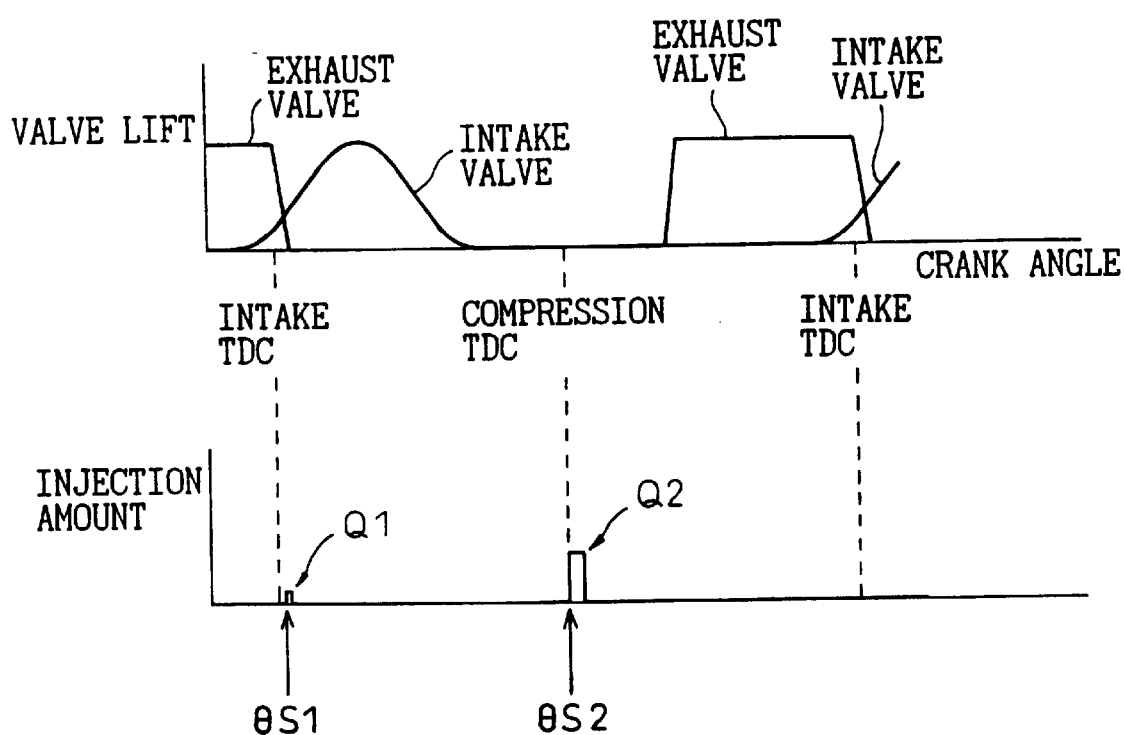
FIG. 27 is a view for explaining VIGOM injection.

FIG. 27 shows a fourth embodiment. In this embodiment, VIGOM injection, an auxiliary injection carried out at the end of the exhaust stroke or at the beginning of the intake stroke prior to a main injection, is performed in the F region of FIG. 25. That is, a small amount of fuel $Q_1$ is injected near intake top dead center as shown in FIG. 27, then main injection $Q_2$ is performed near compression top dead center. In VIGOM injection, it is possible to make the air-fuel ratio rich while suppressing the generation of soot. Therefore, in the fourth embodiment, VIGOM injection is performed so that the air-fuel ratio becomes rich in the F region of FIG. 25, whereby large amounts of unburnt HC and CO are exhausted from the combustion chamber 5.

If Next, an explanation will be made of the fourth embodiment for control of the operation of the engine referring to FIG. 28.

Figure 28:
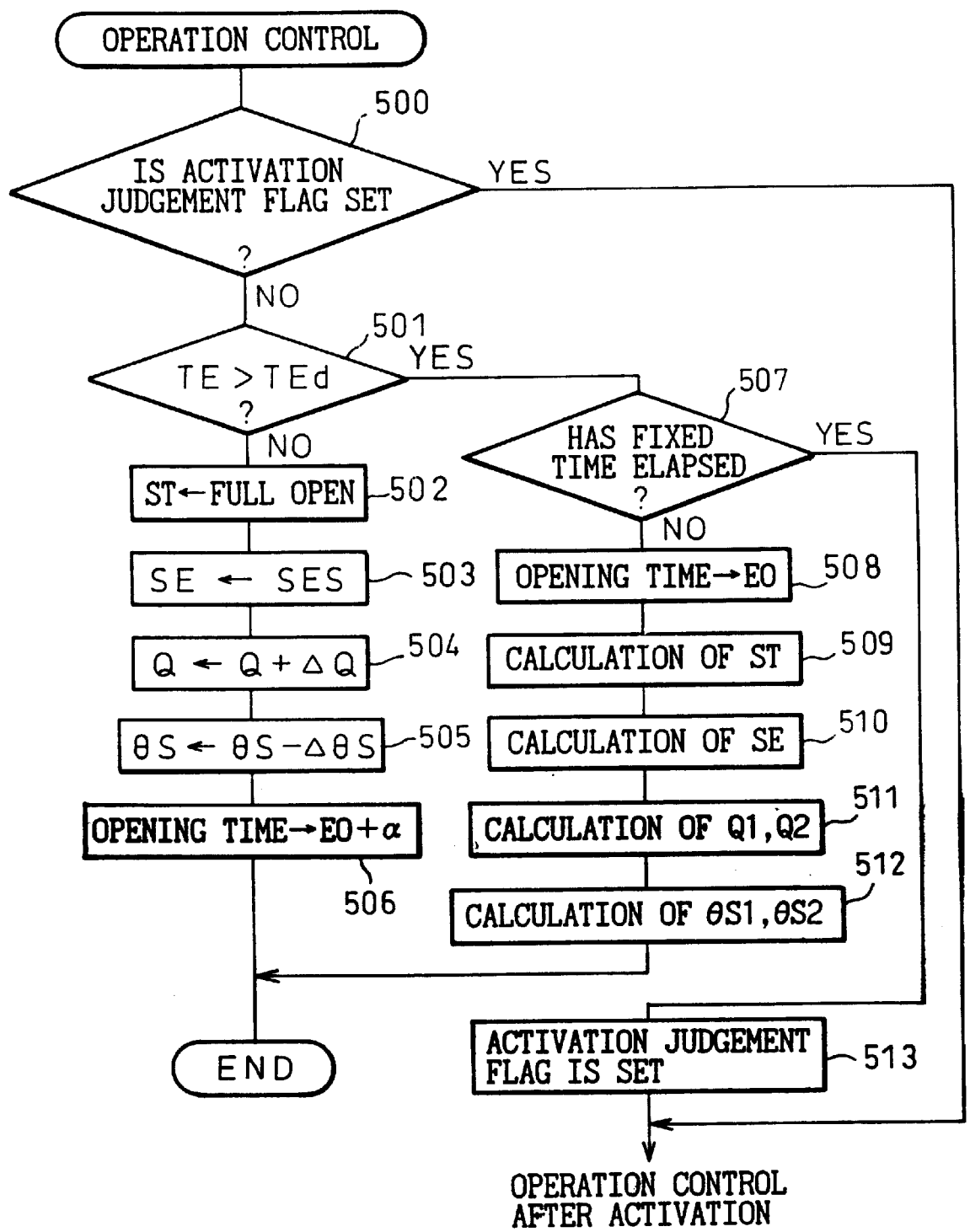
FIG. 28 is a flow chart of a fourth embodiment of the control of engine operation.

Referring to FIG. 28, first, at step 500, it is judged if an activation judgement flag showing that the catalyst 19 has become activated is set or not. When the activation judgement flag is not set, that is, when the catalyst 19 is still not activated, the routine proceeds to step 501, where it is judged if the temperature TE of the exhaust gas downstream of the catalyst 19 detected by the temperature sensor 46 has become larger than a predetermined temperature $TE_d$ or not. When $TE \leq TE_d$, the routine proceeds to step 502.

At step 502, the target opening degree ST of the throttle valve 16 is made full opening, then at step 503, the target opening degree SE of the EGR control valve 23 is made the predetermined opening degree SES. Next, at step 504, the predetermined amount $\Delta Q$ is added to the fuel injection amount Q of when the second combustion is being performed after activation of the catalyst 19 so as to calculate the final fuel injection amount Q ($=Q+\Delta Q$). Next, at step 505, the fixed time $\Delta \theta S$ is subtracted from the injection start timing $\theta S$ of when the second combustion is being performed after the activation of the catalyst 19 so as to calculate the final injection start timing $\theta S$ ($=\theta S - \Delta \theta S$). Next, at step 506, the opening timing of the exhaust valve 9 is made $EO+\alpha$. The second combustion is performed at this time.

Next, when it is judged at step 501 that $TE \leq TE_d$, the routine proceeds to step 507, where it is judged if a fixed time has elapsed or not. When the fixed time has not elapsed, the routine proceeds to step 508, where the opening timing of the exhaust valve 9 is made EO. Next, the routine proceeds to step 509, where VIGOM injection is performed so that the air-fuel ratio becomes rich.

That is, at step 509, the target opening degree ST of the throttle valve 16 is calculated, then at step 510, the opening degree SE of the EGR control valve 23 is calculated. Next, at step 511, the fuel injection amounts $Q_1$ and $Q_2$ are calculated, then at step 512, the injection start timings $\theta S1$ and $\theta S2$ (FIG. 27) are calculated.

On the other hand, when it is judged at step 507 that the fixed time has elapsed, the routine proceeds to step 513, where the activation judgement flag is set. Next, the operation control routine after activation shown in FIG. 23 is executed and first combustion or second combustion is performed. When the activation judgement flag has been set, the routine then proceeds from step 500 to the operation control routine after activation shown in FIG. 23.

Figure 29A:
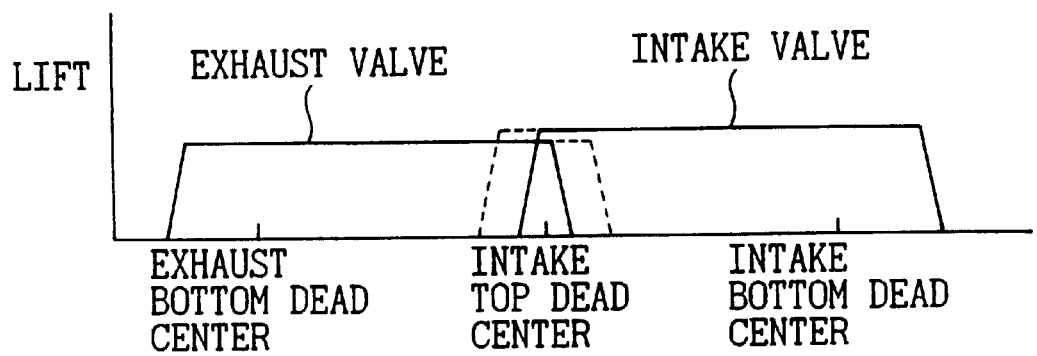
FIGS. 29A and 29B are views explaining a valve overlap time and fuel injection.
Figure 29B:
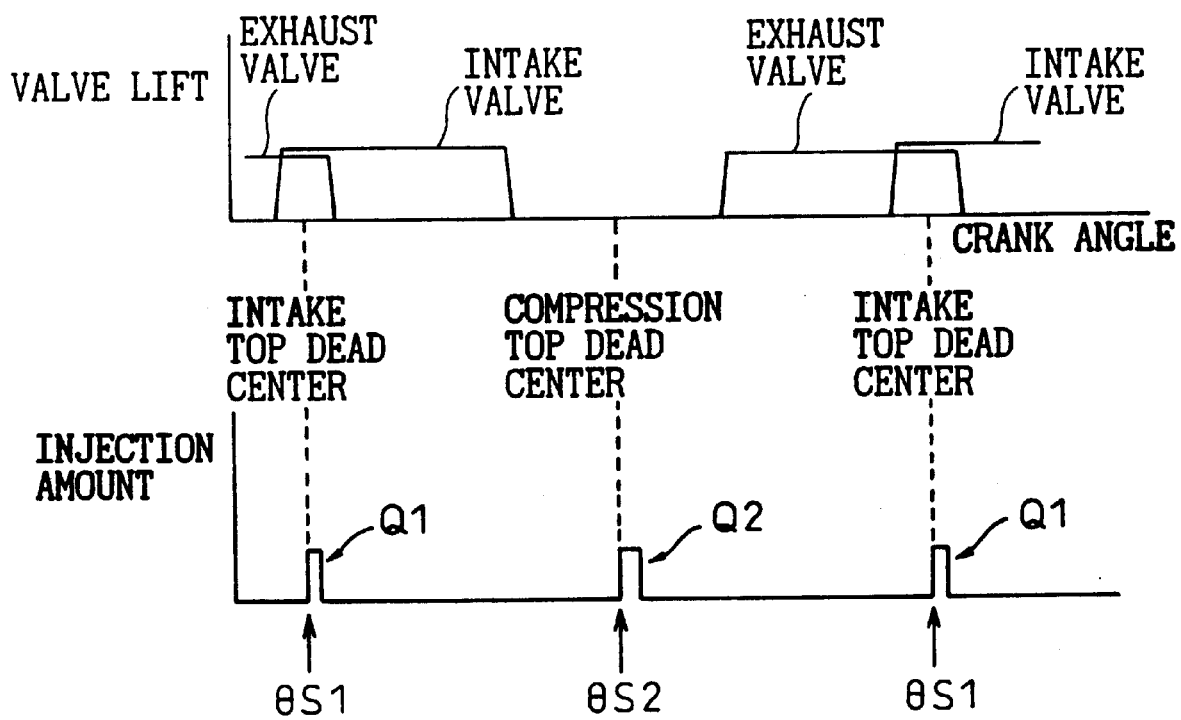

FIG. 29 shows a fifth embodiment. In this embodiment, VIGOM injection is performed in the F region of FIG. 25, the valve overlap time where the intake valve 7 and the exhaust valve 9 both are open is made longer, at least part of the fuel is injected in the valve overlap time, and thereby large amounts of unburnt HC and CO are exhausted from the combustion chamber 5. This will be explained in a little more detail with reference to FIG. 29A and FIG. 29B.

FIG. 29A shows the lift curve of the intake valve 7 and the exhaust valve 9. Note that in FIG. 29A, the solid line shows the case where the valve overlap time when the intake valve 7 and the exhaust valve 9 are both open is relatively short, while the broken line in FIG. 29A shows the case where the valve overlap time is made longer. The valve overlap time can be easily controlled by the actuators 47 and 48.

In an internal combustion engine such as the one shown in FIG. 1, however, when the exhaust valve 9 opens, the inside of the exhaust port 10 becomes a positive pressure temporarily, then the positive pressure wave is propagated to the downstream side and is reflected at for example the collecting portion of the manifold in the form of a negative pressure wave. The negative pressure wave then is propagated toward the upstream side. As a result, vacuum is caused in the exhaust port 10 immediately before the exhaust valve 9 closes. As a result, at the time of valve overlap, part of the air supplied from the intake port 8 to the combustion chamber 5 blows through the exhaust port 10 by the vacuum. The amount blown at this time increases the longer the valve overlap time. Therefore, if the valve overlap time is made longer and fuel is injected during the valve overlap time, a large amount of unburnt HC will be exhausted into the exhaust port 10 along with the air blown through.

Therefore, in the fifth embodiment, the valve overlap time is made longer in the F region of FIG. 25 as shown in FIG. 29B and the first fuel injection $Q_1$ is made to be performed during the valve overlap time and the second fuel injection $Q_2$ near compression top dead center.

Next, an explanation will be given of a fifth embodiment for the control of the operation of the engine referring to FIG. 30.

Figure 30:
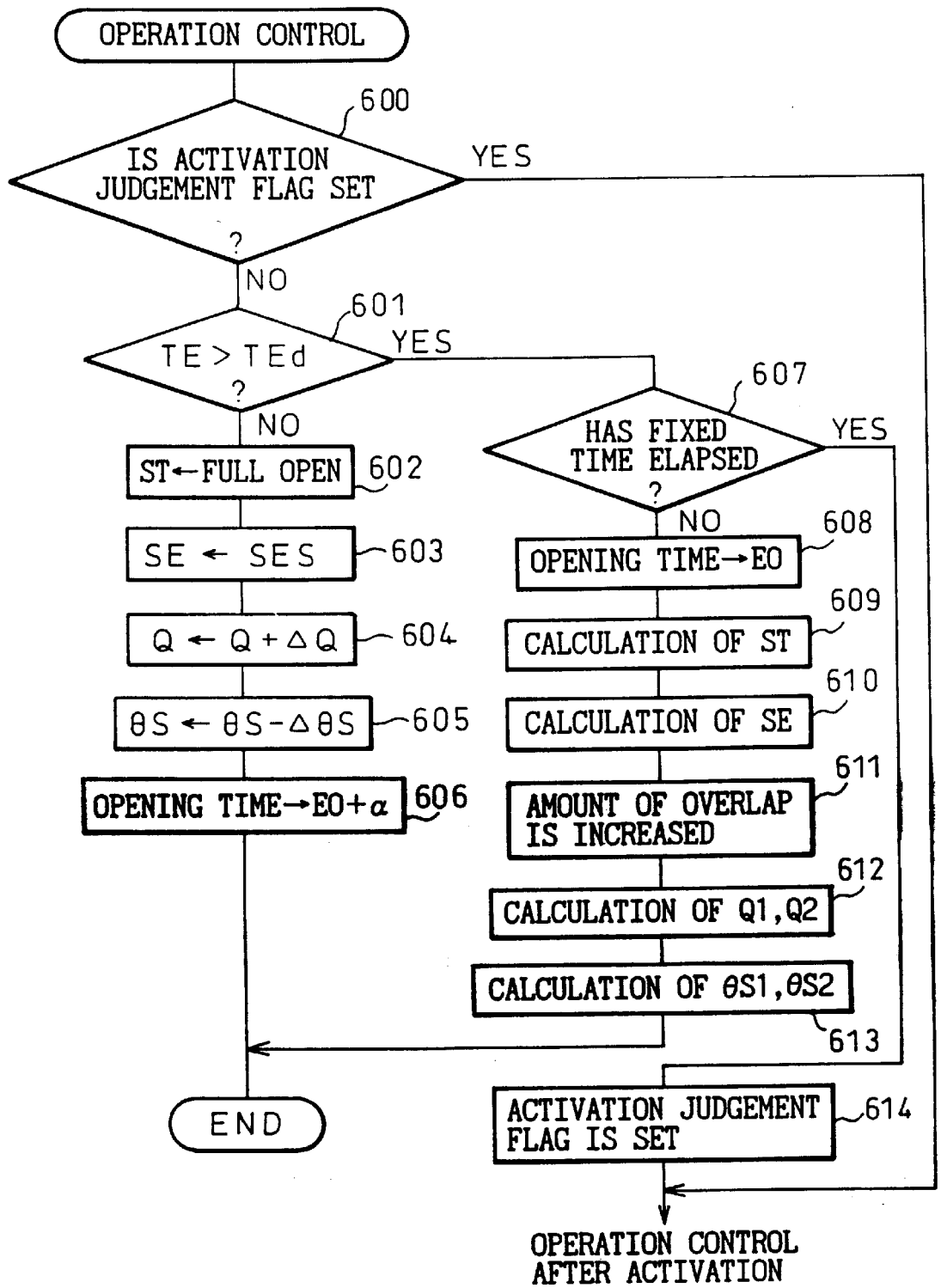
FIG. 30 is a flow chart of a fifth embodiment of the control of engine operation.

Referring to FIG. 30, first, at step 600, it is judged if an activation judgement flag showing that the catalyst 19 has become activated is set or not. When the activation judgement flag is not set, that is, when the catalyst 19 is still not activated, the routine proceeds to step 601, where it is judged if the temperature TE of the exhaust gas downstream of the catalyst 19 detected by the temperature sensor 46 has become higher than a predetermined temperature $TE_d$ or not. When $TE \leq TE_d$, the routine proceeds to step 602.

At step 602, the target opening degree ST of the throttle valve 16 is made full opening, then at step 603, the target opening degree SE of the EGR control valve 23 is made the predetermined opening degree SES. Next, at step 604, the predetermined amount $\Delta Q$ is added to the fuel injection amount Q of when the second combustion is being performed after activation of the catalyst 19 so as to calculate the final fuel injection amount Q ($=Q+\Delta Q$). Next, at step 605, the fixed time $\Delta \theta S$ is subtracted from the injection start timing $\theta S$ of when the second combustion is being performed after the activation of the catalyst 19 so as to calculate the final injection start timing $\theta S$ ($=\theta S - \Delta \theta S$). Next, at step 606, the opening timing of the exhaust valve 9 is made $EO+\alpha$. The second combustion is performed at this time.

Next, when it is judged at step 601 that $TE > TE_d$, the routine proceeds to step 607, where it is judged if a fixed time has elapsed or not. When the fixed time has not elapsed, the routine proceeds to step 608, where the opening timing of the exhaust valve 9 is made EO. Next, the routine proceeds to step 609, where the target opening degree ST of the throttle valve 16 is calculated, then at step 610, the target opening degree SE of the EGR control valve 23 is calculated. Next, at step 611, the actuators 47 and 48 are driven and the valve overlap time is extended. Next, at step 612, the first fuel injection amount $Q_1$ and the second fuel injection amount $Q_2$ are calculated, then at step 613, the injection start timing $\theta S1$ and $\theta S2$ (FIG. 29B) are calculated.

On the other hand, when it is judged at step 607 that the fixed time has elapsed, the routine proceeds to step 614, where the activation judgement flag is set. Next, the operation control routine after activation shown in FIG. 23 is executed and first combustion or second combustion is performed. When the activation judgement flag has been set, the routine then proceeds from step 600 to the operation control routine after activation shown in FIG. 23.

Figure 31:
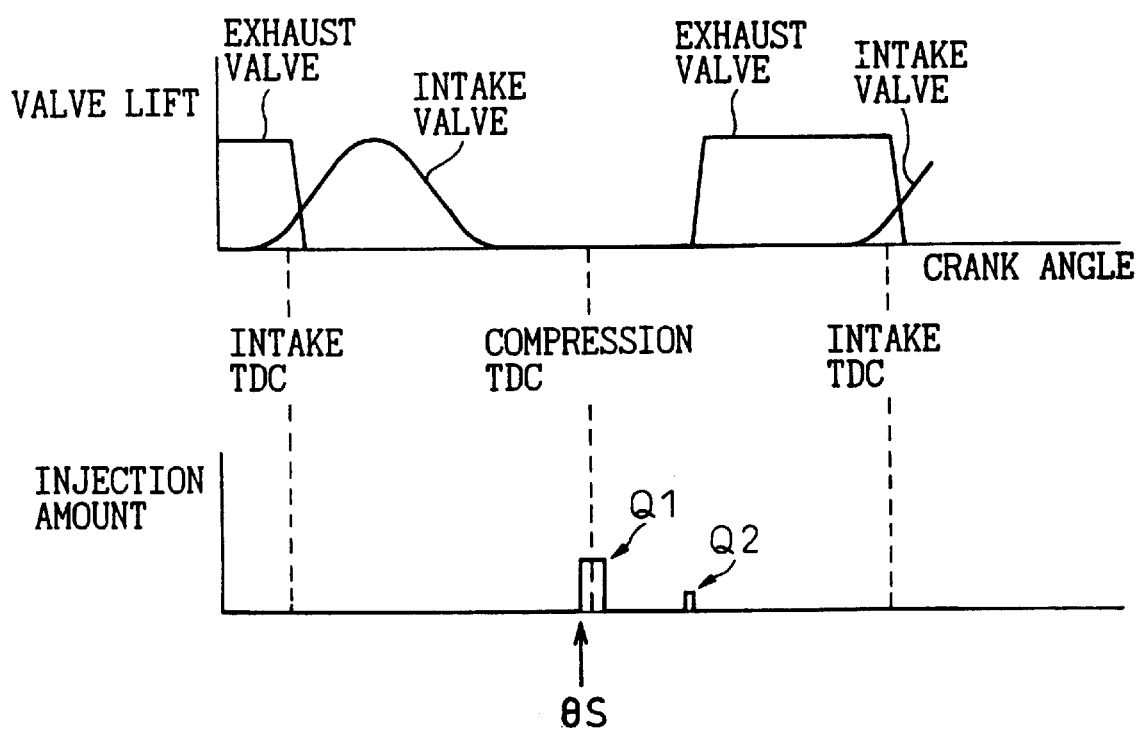
FIG. 31 is a view explaining an additional fuel injection.

FIG. 31 shows a sixth embodiment. In this embodiment, since large amounts of unburnt HC and CO are exhausted from the combustion chamber 5 in the F region shown in FIG. 25, after the end of the main injection Q1, additional fuel Q2 is injected in the expansion stroke or exhaust stroke.

Next, an explanation will be given of the sixth embodiment for the control of the operation of the engine referring to FIG. 32.

Figure 32:
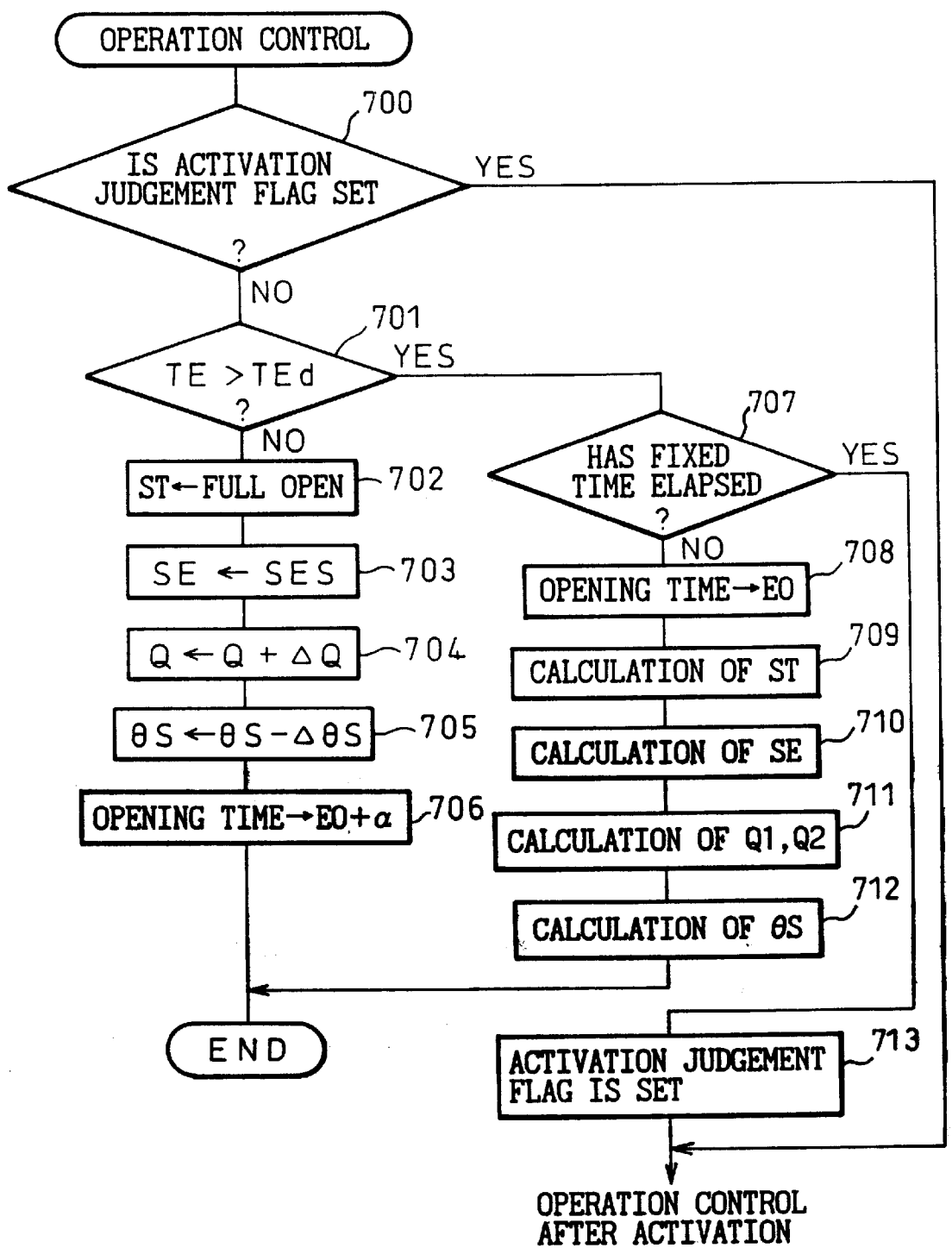
FIG. 32 is a flow chart of a sixth embodiment of the control of engine operation.

Referring to FIG. 32, first, at step 700, it is judged if an activation judgement flag showing that the catalyst 19 has become activated is set or not. When the activation judgement flag is not set, that is, when the catalyst 19 is still not activated, the routine proceeds to step 701, where it is judged if the temperature TE of the exhaust gas downstream of the catalyst 19 detected by the temperature sensor 46 has become higher than a predetermined temperature $TE_d$. When $TE \leq TE_d$, the routine proceeds to step 702.

At step 702, the target opening degree ST of the throttle valve 16 is made full opening, then at step 703, the target opening degree SE of the EGR control valve 23 is made the predetermined opening degree SES. Next, at step 704, the predetermined amount ΔQ is added to the fuel injection amount Q of when the second combustion is being performed after activation of the catalyst 19 so as to calculate the final fuel injection amount Q (=Q+ΔQ). Next, at step 705, the fixed time ΔθS is subtracted from the injection start timing θS of when the second combustion is being performed after the activation of the catalyst 19 so as to calculate the final injection start timing θS (=θS−ΔθS). Next, at step 706, the opening timing of the exhaust valve 9 is made EO+α. The second combustion is performed at this time.

Next, when it is judged at step 701 that $TE>TE_d$, the routine proceeds to step 707, where it is judged if the fixed time has elapsed or not. When the fixed time has not elapsed, the routine proceeds to step 708, where the opening timing of the exhaust valve 9 is made EO. Next, the routine proceeds to step 709, where the additional fuel injection is performed so that the air-fuel ratio becomes rich.

That is, at step 709, the target opening degree ST of the throttle valve 16 is calculated from the map shown in FIG. 18A, while at step 710, the target opening degree SE of the EGR control valve 23 is calculated from the map shown in FIG. 18B. Next, at step 711, the main injection amount $Q_1$ and the additional injection amount $Q_2$ are calculated, then at step 712, the injection start timing θS of the main injection is calculated.

On the other hand, when it is judged at step 707 that the fixed time has elapsed, the routine proceeds to step 713, where the activation judgement flag is set. Next, the operation control routine after activation shown in FIG. 23 is executed and first combustion or second combustion is performed. When the activation judgement flag is set, the routine proceeds from step 700 to the operation control routine after activation shown in FIG. 23.

According to the present invention, as explained above, it is possible to suppress the generation of soot from when the engine operation is started to when the engine is stopped.

While the invention has been described by reference to specific embodiments chosen for purposes of illustration, it should be apparent that numerous modifications could be made thereto by those skilled in the art without departing from the basic concept and scope of the invention.

What is claimed is:

1. A compression ignition type engine in which an amount of production of soot gradually increases and then peaks when an amount of inert gas in a combustion chamber increases and in which a further increase of the amount of inert gas in the combustion chamber results in a temperature of fuel and surrounding gas at the time of combustion in the combustion chamber becoming lower than a temperature of production of soot and therefore almost no production of soot any longer, said engine comprising:

a catalyst arranged in an engine exhaust passage and having an oxidation function and;

switching means for selectively switching between a first combustion where the amount of the inert gas in the combustion chamber is larger than the amount of inert gas where the amount of production of soot peaks and almost no soot is produced and a second combustion where the amount of inert gas in the combustion chamber is smaller than the amount of inert gas where the amount of production of soot peaks, said switching means initially performing the second combustion when the engine operation is started and then switching to the first combustion.

2. A compression ignition type engine as set forth in claim 1, wherein said catalyst is comprised of at least one of an oxidation catalyst, three-way catalyst, and NOx absorbent.

3. A compression ignition type engine as set forth in claim 1, wherein an exhaust gas recirculation device is provided for recirculating exhaust gas, discharged from the combustion chamber, into an engine intake passage and wherein the inert gas is comprised by recirculated exhaust gas.

4. A compression ignition type engine as set forth in claim 3, wherein an exhaust gas recirculation rate in the first combustion state is at least about 55 percent.

5. A compression ignition type engine as set forth in claim 1, wherein the temperature of the fuel and the gas surrounding it at the time of combustion in the first combustion state is a temperature at which the amount of NOx in the exhaust gas becomes around 10 ppm or less.

6. A compression ignition type engine as set forth in claim 1, wherein, in the first combustion state, unburnt hydrocarbons are exhausted from the combustion chamber not in the form of soot but in the form of a soot precursor or a form before that and the unburned hydrocarbons exhausted from the combustion chamber are oxidized by said catalyst.

7. A compression ignition type engine as set forth in claim 1, wherein an engine idling speed is made higher when second combustion, performed first when the engine operation is started, is being performed.

8. A compression ignition type engine as set forth in claim 1, wherein a fuel injection start timing is retarded when second combustion, performed first when the engine operation is started, is being performed.

9. A compression ignition type engine as set forth in claim 1, wherein an opening timing of an exhaust valve is advanced when second combustion, performed first when the engine operation is started, is being performed.

10. A compression ignition type engine as set forth in claim 9, wherein the opening timing of the exhaust valve continues to be advanced for a fixed time even after switching from the second combustion, performed first when the engine operation is started, to the first combustion.

11. A compression ignition type engine as set forth in claim 1, wherein activation judging means is provided for judging if the catalyst has become activated and, said switching means switches from the second combustion to the first combustion when it is judged that the catalyst has become activated.

12. A compression ignition type engine as set forth in claim 11, wherein an engine operating region is divided into a low load side first operating region where the first combustion can be performed and a high load side second operating region where second combustion is performed and, said switching means switches from the second combustion to the first combustion if the engine is operating in the first operating region when it is judged that the catalyst has become activated.

13. A compression ignition type engine as set forth in claim 11, wherein detecting means for detecting a representative temperature representing a temperature of the catalyst and, said activation judging means judges that the catalyst has become activated when the representative temperature exceeds a predetermined temperature.

14. A compression ignition type engine as set forth in claim 13, wherein said detecting means is comprised of a temperature sensor arranged in the engine exhaust passage downstream of said catalyst and, said representative temperature is a temperature of the exhaust gas passing through said catalyst.

15. A compression ignition type engine as set forth in claim 11, wherein temperature sensors are arranged in the engine exhaust passage upstream of the catalyst and the engine exhaust passage downstream of the catalyst and, said activation judging means judges that the catalyst has become activated when a temperature of exhaust gas downstream of the catalyst becomes higher by at least a predetermined temperature than a temperature of exhaust gas upstream of the catalyst.

16. A compression ignition type engine as set forth in claim 1, wherein activation judging means is provided for judging if the catalyst will become activated if temporarily increasing amounts of unburned HC and CO in the exhaust gas when the second combustion is being performed and, unburned HC and CO increasing means is provided for temporarily increasing the amounts of unburned HC and CO in the exhaust gas when it is judged that the catalyst will become activated if temporarily increasing the amounts of unburned HC and CO in the exhaust gas, said judging means switching from the second combustion to the first combustion after the amounts of unburned HC and CO in the exhaust gas are temporarily increased by the unburned HC and CO increasing means.

17. A compression ignition type engine as set forth in claim 16, wherein detecting means is provided for detecting a representative temperature representing a temperature of the catalyst and, said activation judging means judges that the catalyst will become activated if the amounts of unburned HC and CO in the exhaust gas are made to temporarily increase when the representative temperature exceeds a predetermined temperature.

18. A compression ignition type engine as set forth in claim 17, wherein said detecting means is comprised of a temperature sensor arranged in the engine exhaust passage downstream of said catalyst and, said representative temperature is a temperature of the exhaust gas passing through said catalyst.

19. A compression ignition type engine as set forth in claim 16, wherein said unburned HC and CO increasing means increases the amounts of unburned HC and CO in the exhaust gas by temporarily switching to the first combustion when the second combustion is being performed.

20. A compression ignition type engine as set forth in claim 16, wherein said unburned HC and CO increasing means increases the amounts of unburned HC and CO in the exhaust gas by performing VIGOM injection and making an air-fuel ratio rich when the second combustion is being performed.

21. A compression ignition type engine as set forth in claim 16, wherein valve overlap time control means is provided for controlling a valve overlap time where the intake valve and exhaust valve are both open and, said unburned HC and CO increasing means increases the amounts of unburned HG and CO in the exhaust gas by making the valve overlap time longer and injecting at least part of the fuel during the valve overlap time when the second combustion is being performed.

22. A compression ignition type engine as set forth in claim 16, wherein said unburned HC and CO increasing means increases the amounts of unburned HC and CO in the exhaust gas by injecting additional fuel in an explosive stroke or exhaust stroke when the second combustion is being performed.

* * * * *